US012190678B2

(12) United States Patent
Gotlieb et al.

(10) Patent No.: US 12,190,678 B2
(45) Date of Patent: Jan. 7, 2025

(54) METHOD OF INTEGRATING A RETAIL POINT OF SALE AND A THIRD-PARTY INSTANT WIN LOTTERY TICKET DISPENSER

(71) Applicant: Blackhawk Network, Inc., Pleasanton, CA (US)

(72) Inventors: Richard A. Gotlieb, Alamo, CA (US); Vipin Das Anantha Mohandas, Pleasanton, CA (US)

(73) Assignee: Blackhawk Network, Inc., Pleasanton, CA (US)

( * ) Notice: Subject to any disclaimer, the term of this patent is extended or adjusted under 35 U.S.C. 154(b) by 30 days.

(21) Appl. No.: 17/186,491

(22) Filed: Feb. 26, 2021

(65) Prior Publication Data

US 2021/0264725 A1 Aug. 26, 2021

Related U.S. Application Data

(60) Provisional application No. 62/982,053, filed on Feb. 26, 2020.

(51) Int. Cl.
*G07F 17/32* (2006.01)

(52) U.S. Cl.
CPC ........ *G07F 17/3227* (2013.01); *G07F 17/329* (2013.01)

(58) Field of Classification Search
CPC .... G07F 17/329; G07F 17/42; G07F 17/3227; G06Q 50/34; G07C 15/005
See application file for complete search history.

(56) References Cited

U.S. PATENT DOCUMENTS

| | | | | |
|---|---|---|---|---|
| 5,216,595 | A * | 6/1993 | Protheroe | G07G 1/145 463/48 |
| 5,239,165 | A * | 8/1993 | Novak | G07F 17/32 235/383 |
| 2005/0233797 | A1* | 10/2005 | Gilmore | G07F 17/42 463/17 |
| 2006/0079311 | A1* | 4/2006 | Nulph | G07F 17/329 463/17 |
| 2012/0089468 | A1* | 4/2012 | Guziel | G06Q 20/20 705/16 |
| 2016/0381651 | A1* | 12/2016 | Swinkels | H04L 43/0852 370/350 |
| 2017/0018048 | A1* | 1/2017 | Christensen | G07F 17/3234 |
| 2019/0287335 | A1* | 9/2019 | Sandvick | G07F 17/329 |

* cited by examiner

*Primary Examiner* — David L Lewis
*Assistant Examiner* — Robert E Mosser
(74) *Attorney, Agent, or Firm* — Barnes & Thornburg LLP; Jerry C. Harris, Jr.

(57) ABSTRACT

An instant win lottery ticket dispensing system which utilizes a ticket dispenser located at an in-store check-out lane. A method for dispensing instant win lottery tickets comprising interpreting an identifier associated with an instant win lottery game at a point of sale and the interpretation of the identifier resulting in the dispensing of an instant win lottery ticket by a ticket dispenser located at in in-store check-out lane.

19 Claims, 13 Drawing Sheets

100

600

1100

1200

METHOD OF INTEGRATING A RETAIL POINT OF SALE AND A THIRD-PARTY INSTANT WIN LOTTERY TICKET DISPENSER

CROSS-REFERENCE TO RELATED APPLICATIONS

This application claims priority to provisional application U.S. Ser. No. 62/982,053 filed Feb. 26, 2020 by Richard Alan Gotlieb, et. al. and entitled "Method of Integrating a Retail Point of Sale and a Third-Party, Instant Win Lottery Ticket Dispenser," provisional application U.S. Ser. No. 62/982,053 is incorporated herein by reference in its entirety.

BACKGROUND

Convenience stores sell significantly more instant lottery tickets than grocery stores and other multi-lane retailers. Many consumers prefer the convenience offered by the smaller stores because lottery purchases can be made alongside other purchases, as one transaction. Conversely, in grocery stores and other multi-lane retailers, instant lottery tickets are generally available only at either customer service or a vending machine. As such, a consumers who purchase instant lottery tickets at a grocery store are required spend more time checking out, i.e., check-out twice, in the checkout lane for the groceries and then at the instant lottery ticket sales location.

SUMMARY

In some embodiments is a computer-implemented method for distributing instant win lottery tickets at a point of sale check-out lane, the method comprising: providing an interpretable identifier, wherein the interpretable identifier corresponds to an instant win lottery game; receiving a request for an instant win lottery ticket, wherein the instant win lottery ticket is associated with the instant win lottery game; and sending an instant win lottery ticket dispense request, wherein the instant win lottery ticket dispense request causes an instant win lottery ticket dispenser to dispense the instant win lottery ticket.

In some embodiments is a computer-implemented method for distributing instant win lottery tickets at a point of sale check-out lane, the method comprising: providing an interpretable identifier, wherein the interpretable identifier corresponds to an instant win lottery game; receiving a request for an instant win lottery ticket, wherein the instant win lottery ticket is associated with the instant win lottery game; sending an instant win lottery ticket dispense request, wherein the instant win lottery ticket dispense request causes an instant win lottery ticket dispenser to dispense the instant win lottery ticket; and receiving a dispense message, wherein the dispense message comprises information concerning instructions sent to the instant win lottery ticket dispenser.

In some embodiments is a system for distributing instant win lottery tickets at a point of sale check-out lane comprising: a computer system, wherein the computer system comprises a central processor unit which executes stored executable instructions which cause the computer system to: provide an interpretable identifier, wherein the interpretable identifier corresponds to an instant win lottery game; receive a request for an instant win lottery ticket, wherein the instant win lottery ticket is associated with the instant win lottery game; and send an instant win lottery ticket dispense request, wherein the instant win lottery ticket dispense request causes an instant win lottery ticket dispenser to dispense the instant win lottery ticket.

DETAILED DESCRIPTION

Figure 1:
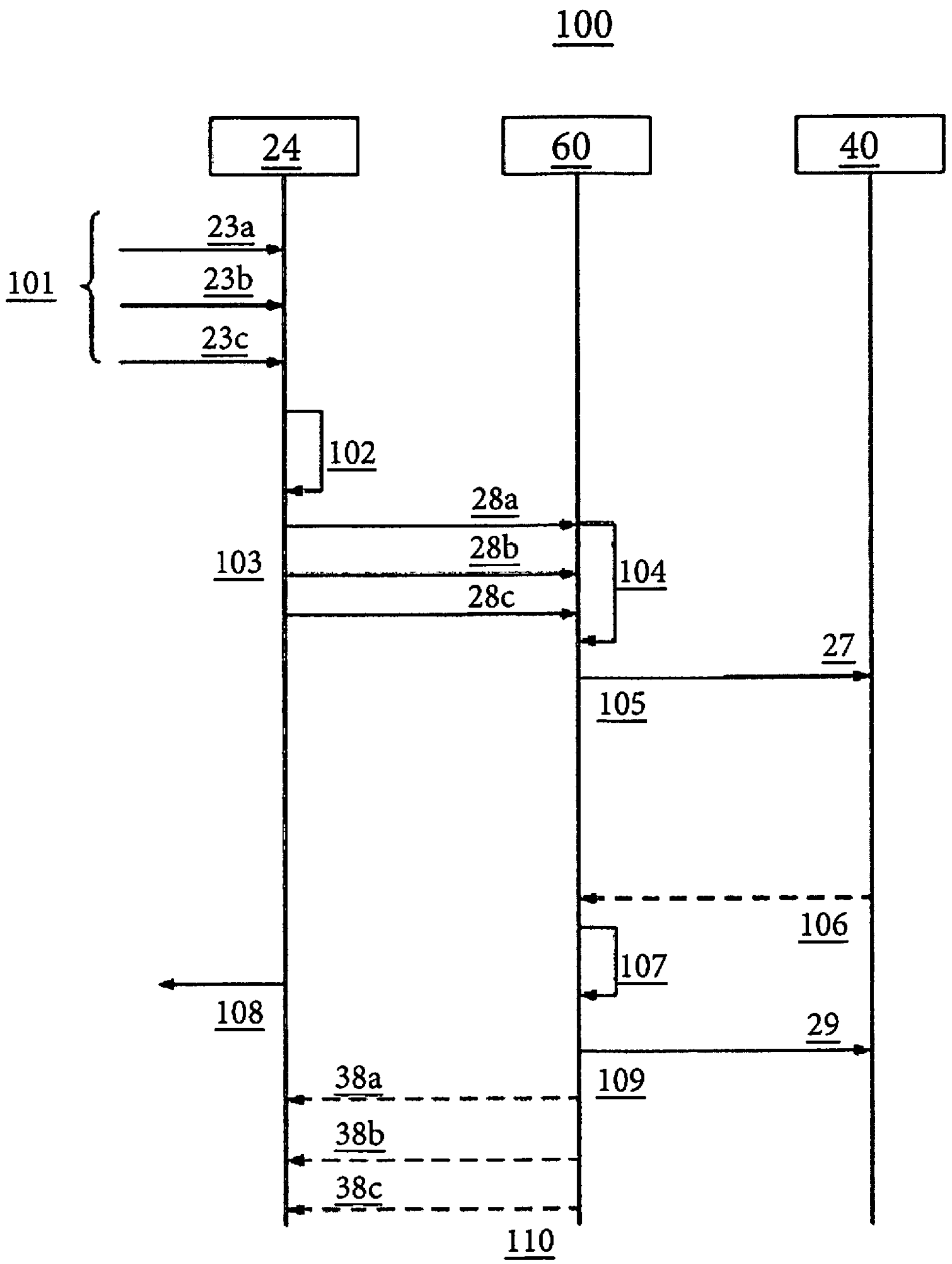
FIG. 1 illustrates an embodiment of a process for dispensing instant win lottery tickets at an in-store check-out lane upon receipt of a consumer's selection of instant win lottery games to play.

Embodiments of the disclosure relate to instant win lottery tickets/games capable of being activated and dispensed at point of sale (POS) in a retail store, e.g., scratch-off lottery tickets.

Instant win lottery tickets, e.g., scratch-off lottery tickets, contain hidden pre-printed winning and losing game data which distinguish this form of lottery ticket from other various forms in which winning numbers are drawn some time after the sale of the ticket. Such an instant win lottery game utilizes a ticket, card, or other paper imprinted with indicia (such as information relating to certain numbers, symbols, words and the like) which indicate whether the bearer has won a prize. Such instant win lottery tickets must obscure the winning indication information from observation by both the ticket distributor and the ticket purchaser until after the ticket has been sold. In this way, neither the ticket distributor nor the purchaser can determine which of a large number of tickets contain the winning indicating information.

Third-parties, such as Scientific Games®, have developed electronic ticket dispensing machines that, if properly configured and enabled, could be installed in lane in grocery stores to dispense instant win lottery tickets.

Disclosed herein is a novel and useful interface that allows a third-party ticket dispensing machine to be controlled by a retailer's point of sale system.

In an embodiment, a lottery ticket sales facilitation agent 60 (as used herein "lottery ticket sales facilitation agent 60" refers to a party and the party's computer system operated and/or controlled by the party and which is more fully described in reference to computer system 1380 herein) and/or affiliate 70 creates printed hang-tags 10 that graphically depict a particular instant win lottery game (an "instant win hang-tag"). The instant win hang-tags 10 comprise an interpretable identifier 15 which identifies a particular type of instant win lottery game 20. The interpretable identifier 15 may comprise a barcode 16; an intelligent code 17 (e.g., a QR code); an arrangement of numerals, letters, symbols, images, and/or colors; an electromagnetic signal (e.g., near field communication ("NFC"), infrared, RFID); a mechanical wave (e.g., sound); or combinations thereof. In an embodiment, at a point of sale 24, the interpretable identifier 15 may be interpreted, scanned, input, and/or read ("scan" may be used to reference any of the foregoing) by a point of sale device 25 via barcode scanner, camera manipulation, physical gesture (e.g., finger swipe), voice recognition, NFC communication, Bluetooth communication, or other known methods for engaging a point of sale device 25 for information reception.

The retailer 80, the lottery ticket sales facilitation 60 and/or affiliate 70, or a third-party may install a sign in store that advertises the availability of such instant win lottery games 20.

A consumer 90 selects an instant win hang-tag 10 and takes it to the cashier 85 at a particular check-out lane for purchase. Each instant win hang-tag 10 will have an interpretable identifier 15, e.g., a barcode, that is a systemic indicator for the product 30 (e.g., instant win lottery game 20, instant win lottery ticket 35, or instant win lottery tickets) the consumer 90 wishes to purchase.

The consumer 90 presents the instant win hang-tag 10 (or multiple instant win hang-tags) to the cashier 85 and tells the cashier 85 the quantities they wish to purchase for each instant win lottery game 20. Alternatively, each instant win hang-tag 10 corresponds to an actual instant win lottery ticket 35 available for purchase. Alternatively, each instant win hang-tag 10 corresponds to a plurality of instant win lottery tickets 35 available for purchase for a particular instant win lottery game 20, e.g., three tickets for game A 21, four tickets for game A 21, five tickets for game A 21, etc. Alternatively, each instant win hang-tag 10 corresponds to a plurality of instant win lottery tickets 35 available for purchase for different instant win lottery games 20, e.g., one ticket for game A 21 and two tickets for game B 22, two tickets for game A 21 and one ticket for game B 22, four tickets for game A 21 and five tickets for game B 22, etc.

The cashier 85, via the point of sale device 25, scans the interpretable identifier 15, potentially multiple times, with each scan denoting purchase of one instant win lottery ticket 35 of for the particular instant win lottery game 20 for which the instant win hang-tag 10 is associated.

In another embodiment, an interpretable identifier 15 corresponds to a specific quantity of a specific product 30, e.g., if a consumer 90 wanted five instant win lottery tickets 35 for instant win lottery game A 21 or for instant win lottery game B 22, the cashier 85 would need to only scan one interpretable identifier 15, e.g., scan only one barcode 16, to cause the point of sale instant win lottery ticket dispenser 40 to dispense the consumer's desired instant win lottery tickets 35 for conveyance to the consumer 90. If the consumer 90 wanted dome combination of tickets for both instant win lottery game A 21 and instant win lottery game B 22, the cashier 85 would need to scan one interpretable identifier 15 for instant win lottery game A 21 and one interpretable identifier 15 for instant win lottery game B 22.

In another embodiment, an interpretable identifier 15 corresponds to, and identifies, the particular instant win lottery game 20 the consumer 90 desires to play. The interpretable identifier 15 is scanned at the point of sale, e.g., by the point of sale device 25, and the quantity of instant win lottery tickets 35 desired for purchase is entered at the point of sale, e.g., via the point of sale device 25.

The consumer 90 tenders payment for the purchase transaction comprising the instant win lottery ticket(s) 35.

Post acceptance of payment, the point of sale instant win lottery ticket dispenser 40 at the check-out lane will dispense the desired instant win lottery ticket(s) 35.

The cashier 85 the presents the dispensed instant win lottery ticket(s) 35 to the consumer 90 or authorizes the consumer 90 to collect the instant win lottery ticket(s) 35.

In another embodiment, a lottery ticket sales facilitation agent 60 and/or affiliate 70 creates a point of sale interpretable/readable compilation of instant win lottery ticket interpretable identifiers 18, e.g., a scan ring, wherein the point of sale interpretable/readable compilation 18 comprises interpretable identifiers 15 and each of the interpretable identifiers 15 identify a particular type of instant win lottery game 20. The interpretable identifier 15 of a point of sale interpretable/readable compilation 18 may comprise a barcode 16; a QR code 17; an arrangement of numerals, letters, symbols, images, and/or colors; an electromagnetic signal (e.g., near field communication ("NFC"), infrared, RFID); a mechanical wave (e.g., sound); or combinations thereof. In an embodiment, the interpretable identifier 15 may be interpreted, scanned, input, and/or read ("scan" may be used to reference any of the foregoing) by a point of sale device 25 via barcode scanner, camera manipulation, physical gesture (e.g., finger swipe), voice recognition, NFC communication, Bluetooth communication, or other known methods for engaging a point of sale device 25 for information reception.

In an embodiment, a consumer 90 selects an instant win lottery game 20 (or multiple instant win lottery games) for which the consumer 90 wishes to play (i.e., purchase instant win lottery tickets 35 for) and informs a cashier 85 at a particular check-out lane of such instant win lottery game 20.

The cashier 85 locates the point of sale interpretable/readable compilation 18 of instant win lottery ticket interpretable identifiers 15 and scans the interpretable identifier (s) 15 (possibly multiple times) which correspond to the consumer's selected instant win lottery game(s) 20.

The consumer 90 tenders payment for the purchase transaction comprising the instant win lottery ticket(s) 35.

Post acceptance of payment, the point of sale instant win lottery ticket dispenser 40 at the check-out lane will dispense the desired instant win lottery ticket(s) 35 for conveyance to the consumer 90.

The cashier 85 the presents the dispensed instant win lottery ticket(s) 35 to the consumer 90 or authorizes the consumer 90 to collect the instant win lottery ticket(s) 35.

In an embodiment, instead of the consumer 90 presenting the cashier 85 with an instant win hang-tag 10 or the cashier 85 utilizing a point of sale interpretable/readable compilation of instant win lottery ticket interpretable identifiers 18, the consumer 90 uses its own electronic device 50, e.g., a smart phone or other computer device, to read/interpret an interpretable identifier 15 which identifies a particular type of instant win lottery game 20. In an embodiment, the consumer's device 50 may capture an image 55 of the interpretable identifier 15 for display at the point of sale, e.g. for scanning by a point of sale device 25.

In an embodiment, an instant win hang-tag 10 or other physical indicator, for example, is located on an endcap display 12. A physical retail location may have a physical endcap display 12 which is a display for instant win lottery games 20 and instant win lottery tickets 35 available for purchase. The endcap display 12 may also have at least one rack 13 which holds one or more instant win hang-tags 10 and/or physical indicators. An instant win hang-tag 10 may comprise cardboard, plastic, or other material suitable for display on an endcap display 12.

In an embodiment, the instant win hang-tag 10 may hang on a rack 13 of the endcap display 12. The instant win hang-tag 10 may comprise an intelligent code 17, a barcode 16, or both. In embodiments where the instant win hang-tag 15 comprises a barcode 16, the intelligent code 17 may be displayed on the endcap display 12. In embodiments where the instant win hang-tag 10 comprises a barcode 16 and intelligent code 17, the intelligent code 17 may not be displayed on the endcap display 12.

In an embodiment, the consumer's device 50 captures the intelligent code 17, the barcode 16, or both from the endcap display 12 (e.g., from the instant win hang-tag 10 and/or other physical indicator) and converts the captured information from the intelligent code 17, the barcode 16, or both into a point of sale interpretable identifier 15. The point of sale interpretable identifier 15 may comprise an EAN128 barcode, a dynamic EAN128 barcode, a UPC, a QR code, any other point of sale interpretable identifier, or combinations thereof. The point of sale interpretable identifier 15 may be configured for display, e.g., as an image 55, on the consumer's device 50.

The consumer 90 presents its device 50, displaying the point of sale interpretable identifier 15, to the cashier 85 and tells the cashier 85 the quantities the consumer 90 desires to purchase for each instant win lottery game 20.

The cashier 85 scans the point of sale interpretable identifier 15 from the consumer's device 50, potentially multiple times, with each scan denoting purchase of one instant win lottery ticket 35 of for the particular instant win lottery game 20 for which the point of sale interpretable identifier 15 displayed on the consumer's device 50 is associated.

The consumer tenders payment for the purchase transaction comprising the instant win lottery ticket(s) 35.

In an embodiment, the consumer 90, using a mobile application 56 or web interface 57 accessible via the consumer's device 50, may view the available instant win lottery games 20 loaded in the point of sale instant win lottery ticket dispenser 40, and select the instant win lottery games 20 the consumer 90 wants to play in the quantities of instant win lottery tickets 35 the consumer desires, i.e. the consumer order 26. Information 96 concerning the consumer order 26 is stored by the lottery ticket sales facilitation agent 60, and the lottery ticket sales facilitation agent 60 assigns a unique reference ID 97 against the order 26, and may also calculate the amount of the order 98. Once the consumer 90 is in the check-out lane 83 at a participating retailer 80, the consumer 90 opens the mobile application 56 (or web interface 57), and retrieves a bar code 16 (or intelligent code 17), which is scanned by the cashier 85 (or otherwise interpreted) via a point of sale device 25. The point of sale device 25 then sends the reference ID 97, which is encoded in the bar code 16 (or intelligent code 17), to the lottery ticket sales facilitation agent 60. The lottery ticket sales facilitation agent 60 retrieves the order 26 details and sends a ticket dispense request 27 to the point of sale instant win lottery ticket dispenser 40 to dispense the consumer's desired instant win lottery ticket(s) 35.

Post acceptance of payment, the point of sale instant win lottery ticket dispenser 40 will dispense the desired instant win lottery ticket(s) 35.

The cashier 85 the presents the dispensed instant win lottery ticket(s) 35 to the consumer 90 or authorizes the consumer 90 to collect the instant win lottery ticket(s) 35.

FIG. 1 depicts a process 100 for providing an instant win lottery ticket 35 to a consumer 90 at a retailer's point of sale check-out lane 83 in response to a consumer's selection of several instant win lottery games 20 which the consumer 90 wants to play.

At 101, a consumer 90, at a point of sale 24, asks for instant win lottery tickets 35 corresponding to instant win lottery games 20, i.e., the consumer 90 asks for two instant win lottery tickets 35 for instant win lottery game A 21 and one instant win lottery ticket 35 for instant win lottery game B 22.

In an embodiment, a cashier 85 retrieves a scan ring 18 and scans an interpretable identifier 15, e.g., a bar code 16 or intelligent code 17, corresponding to each of the instant win lottery games 20 asked for by the consumer 90, e.g., interpretable identifier 15 for instant win lottery game A 21 is scanned twice producing two ticket dispense request messages (e.g., 23*a* and 23*b*) and interpretable identifier 15 for instant win lottery game B 22 is scanned once producing one ticket dispense request message (e.g., 23*c*).

In an embodiment, the consumer 90 presents an instant win hang-tag 10 to the cashier 85 which contains an interpretable identifier 15, e.g., a bar code 16 or intelligent code 17, corresponding to each particular instant win lottery game 20, e.g. instant win lottery game A 21 and instant win lottery game B 22. Each scan of the bar code 16 (or intelligent code 17) on the respective hang tags 10 produces a ticket dispense request message (e.g., 23*a*, 23*b*, and 23*c*) for the instant win lottery game 20 associated with the particular hang tag 10.

In an embodiment, the consumer 90 presents an image 55 (displayed on consumer's device 50) to the cashier 85 which contains an interpretable identifier 15, e.g., a bar code 16 or intelligent code 17, corresponding to a particular instant win lottery game 20. Each scan of the bar code 16 (or intelligent code 17) produces a ticket dispense request message (e.g., messages 23*a* and 23*b* for a scan of image 55*a* which corresponds to instant win lottery game A 21 or message 23*c* for a scan of image 55*b* which corresponds to instant win lottery game B 22) for the instant win lottery game 20 associated with the particular image 55. For example, the consumer could display image 55*a* corresponding to instant win lottery game A 21 and then display an image 55*b* corresponding to instant win lottery game B 22.

In an embodiment, the consumer 90, via the consumer's device 50, electronically conveys information 91 corresponding to a particular instant win lottery game 20 directly to the point of sale device 25, e.g., via NFC communication, Bluetooth communication, or other known methods for engaging a point of sale device 25 for information reception. Each conveyance of information 91 results in a ticket dispense request message (e.g., 23*a*, 23*b*, and 23*c*). For example, the consumer could convey information 91 corresponding to instant win lottery game A 21 and then convey information 91 corresponding to instant win lottery game B 22.

At 102, the cost of the instant win lottery tickets 35 to be purchased, in addition to any other merchandise presented for check-out, are totaled and the consumer 90 provides payment.

At 103, immediately, following a successful payment, a device at the point of sale 24 is programmed to send a ticket activation message 28 for each requested instant win lottery ticket 35 to the lottery ticket sales facilitation agent 60 for each ticket dispense request message (e.g., 23*a*, 23*b*, and 23*c*) it has processed. Each ticket activation message 28 will include information 36 identifying the instant win lottery ticket 35 to be dispensed (e.g., information from ticket dispense request messages 23*a*, 23*b*, and 23*c*), a retail store identifier 81, and a POS identifier 82.

At 104, upon receipt of the first ticket activation message 28 (e.g., message 28*a*), the lottery ticket sales facilitation agent 60 begins a delay 61 (e.g., one second, two, seconds, three seconds, or some portions thereof, etc.), and waits to receive any further ticket activation messages 28 before the delay 61 expires.

At 105, once the delay 61 expires, the lottery ticket sales facilitation agent 60 sends a ticket dispense request 27 to the point of sale instant win lottery ticket dispenser 40. The ticket dispense request 27 may comprise some or all of information 36 contained in the step at 103 along with other types of data.

At 106, the point of sale instant win lottery ticket dispenser 40 begins to dispense instant win lottery tickets 35 which correspond to the ticket dispense request 27.

At 107, if the lottery ticket sales facilitation agent 60 is going to send a ticket dispense status update message 29 (which may or may not be sent depending on operational options), the lottery ticket sales facilitation agent 60 initiates a wait timer 62 (e.g., one second, two, seconds, three seconds, or some portions thereof, etc.) to allow the cashier 85 enough time to properly deliver the instant win lottery tickets 35 to the consumer 90 prior to the lottery ticket sales facilitation agent 60 sending the ticket dispense status update message 29 to the point of sale instant win lottery ticket dispenser 40.

At 108, the cashier 85 separates the instant win lottery tickets 35 that correspond to the ticket dispense request 27 and delivers the instant win lottery tickets 35 to the consumer 90.

At 109, if the lottery ticket sales facilitation agent 60 is going to send a ticket dispense status update message 29 (which may or may not be sent depending on operational options), the lottery ticket sales facilitation agent 60 sends the ticket dispense status update message 29 to the point of sale instant win lottery ticket dispenser 40. In an embodiment, the lottery ticket sales facilitation agent 60 sends the ticket dispense status update message 29 when triggered by an input at the point of sale 24, e.g., triggering can be via pressing a button at the point of sale 24 by a cashier 85 or the scanning of a particular machine-readable code by the cashier 85. In an embodiment, the lottery ticket sales facilitation agent 60 sends the ticket dispense status update message 29 when triggered by a timer, e.g., wait timer 62, which may begin upon the point of sale instant win lottery ticket dispenser 40 beginning its dispensing of instant win lottery tickets 35 in response to the ticket dispense request 27. In an embodiment, the lottery ticket sales facilitation agent 60 may send the ticket dispense status update message 29 only at the beginning of a next consumer's point of sale transaction when the point of sale device 25 sends the next consumer's ticket activation message 28 to the lottery ticket sales facilitation agent 60 for said next customer.

At 110, the lottery ticket sales facilitation agent 60 sends an activation request response message 38 to the point of sale 24 for each requested instant win lottery ticket 35 (e.g., activation request response messages 38*a*, 38*b*, and 38*c*). The activation request response message 38 may be used by the retailer 80 and/or point of sale 24 to track and record activities related to instant win lottery games 20, instant win lottery tickets 35, ticket activation messages 28, ticket dispense requests 27, and or combinations thereof.

Figure 2:
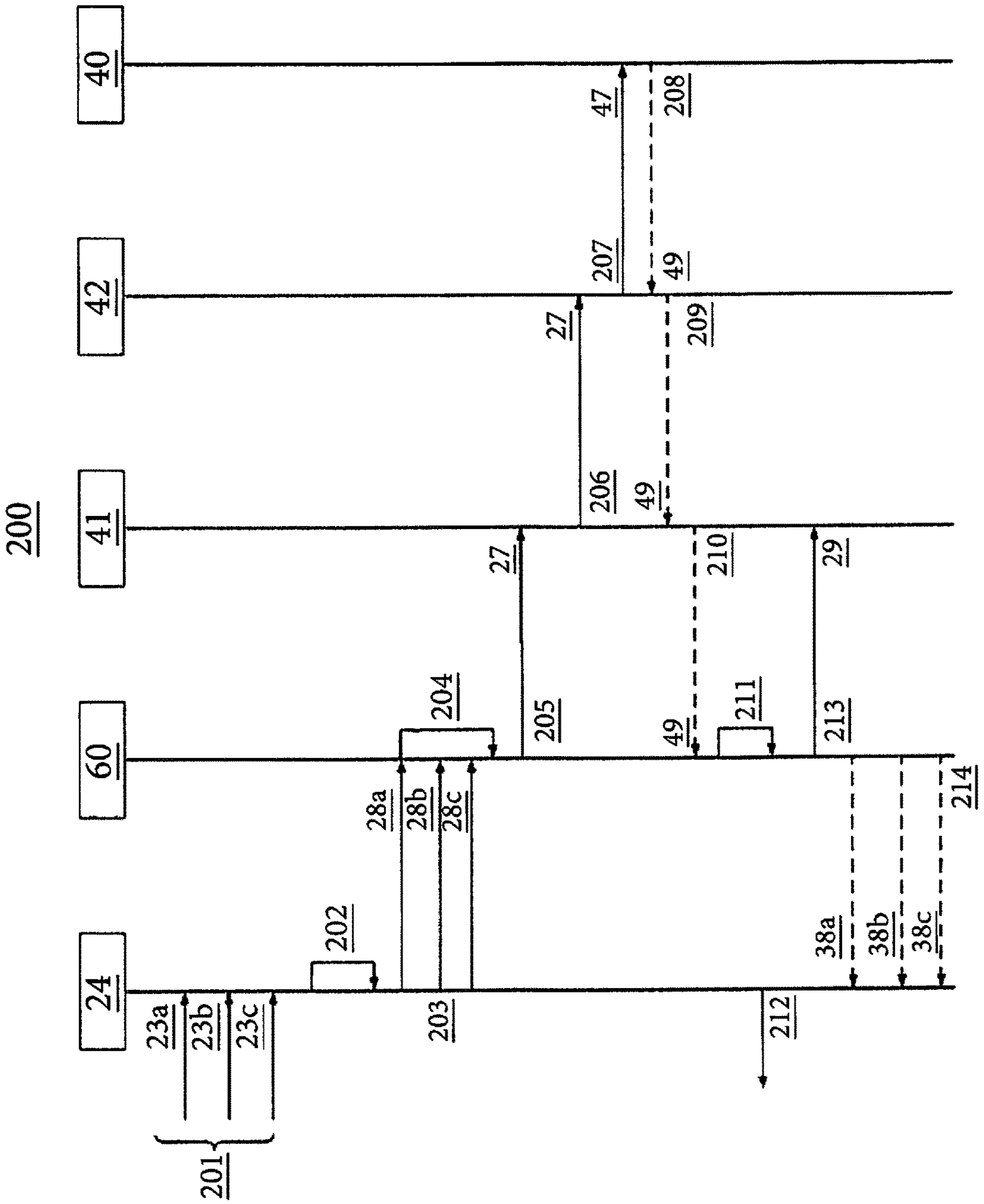
FIG. 2 illustrates an embodiment of a process for dispensing instant win lottery tickets at an in-store check-out lane upon receipt of a consumer's selection of instant win lottery games to play.

FIG. 2 depicts a process 200 for providing instant win lottery tickets 35 to a consumer 90 at a retailer's point of sale check-out lane 83 in response to a consumer's selection of several instant win lottery games 20 which the consumer 90 wants to play.

At 201, a consumer 90, at a point of sale 24, asks for instant win lottery tickets 35 corresponding to instant win lottery games 20, i.e., the consumer 90 asks for two instant win lottery tickets 35 for instant win lottery game A 21 and one instant win lottery ticket 35 for instant win lottery game B 22.

In an embodiment, a cashier 85 retrieves a scan ring 18 and scans an interpretable identifier 15, e.g., a bar code 16 or intelligent code 17, corresponding to each of the instant win lottery games 20 asked for by the consumer 90, e.g., interpretable identifier 15 for instant win lottery game A 21 is scanned twice producing two ticket dispense requests messages (e.g., 23*a* and 23*b*) and interpretable identifier 15 for instant win lottery game B 22 is scanned once producing one ticket dispense request message (e.g., 23*c*).

In an embodiment, the consumer 90 presents an instant win hang-tag 10 to the cashier 85 which contains an interpretable identifier 15, e.g., a bar code 16 or intelligent code 17, corresponding to each particular instant win lottery game 20, e.g. instant win lottery game A 21 and instant win lottery game B 22. Each scan of the bar code 16 (or intelligent code 17) on the respective hang tags 10 produces a ticket dispense request message (e.g., 23*a*, 23*b*, and 23*c*) for the instant win lottery game 20 associated with the particular hang tag 10.

In an embodiment, the consumer 90 presents an image 55 (displayed on consumer's device 50) to the cashier 85 which contains an interpretable identifier 15, e.g., a bar code 16 or intelligent code 17, corresponding to a particular instant win lottery game 20. Each scan of the bar code 16 (or intelligent code 17) produces a ticket dispense request message (e.g., messages 23*a* and 23*b* for a scan of image 55*a* which corresponds to instant win lottery game A 21 or message 23*c* for a scan of image 55*b* which corresponds to instant win lottery game B 22) for the instant win lottery game 20 associated with the particular image 55. For example, the consumer could display image 55*a* corresponding to instant win lottery game A 21 and then display an image 55*b* corresponding to instant win lottery game B 22.

In an embodiment, the consumer 90, via the consumer's device 50, electronically conveys information 91 corresponding to a particular instant win lottery game 20 directly to the point of sale device 25, e.g., via NFC communication, Bluetooth communication, or other known methods for engaging a point of sale device 25 for information reception. Each conveyance of information 91 results in a ticket dispense request message (e.g., 23*a*, 23*b*, and 23*c*). For example, the consumer could convey information 91 corresponding to instant win lottery game A 21 and then convey information 91 corresponding to instant win lottery game B 22.

At 202, the cost of the instant win lottery tickets 35 to be purchased, in addition to any other merchandise presented for check-out, are totaled and the consumer 90 provides payment.

At 203, immediately, following a successful payment, a device at the point of sale 24 is programmed to send a ticket activation message 28 for each requested instant win lottery ticket 35 to the lottery ticket sales facilitation agent 60 for each ticket dispense message (e.g., 23*a*, 23*b*, and 23*c*) it has processed. Each ticket activation message 28 will include information 36 identifying the instant win lottery ticket 35 to be dispensed (e.g., information from ticket dispense request messages 23*a*, 23*b*, and 23*c*), a retail store identifier 81, and a POS identifier 82.

At 204, upon receipt of the first ticket activation message 28 (e.g., message 28*a*), the lottery ticket sales facilitation agent 60 begins a delay 61 (e.g., one second, two, seconds, three seconds, or some portions thereof, etc.), and waits to receive any further ticket activation messages 28 before the delay 61 expires.

At 205, once the delay 61 expires, the lottery ticket sales facilitation agent 60 sends a ticket dispense request 27 to a third party 41 (e.g., a third party computer server and/or processor) which controls the point of sale instant win lottery ticket dispenser 40. The ticket dispense request 27 may comprise some or all of information 36 contained in the step at 203 along with other types of data.

At 206, the third party 41 sends the ticket dispense request 27 to an in-store controller 42 (which may communicate with a plurality of point of sale instant win lottery ticket dispensers 40 located in various different retail locations).

At 207, the in-store controller 42 sends a dispense instruction 47 to the point of sale instant win lottery ticket dispenser 40.

At 208, the point of sale instant win lottery ticket dispenser 40 sends a dispense results message 49 to the in-store controller 42 and begins to dispense the instant win lottery tickets 35 which corresponds to the ticket dispense request 27.

At 209, the in-store controller 42 sends the dispense results message 49 to the third party 41.

At 210, the third party sends the dispense results message 49 to the lottery ticket sales facilitation agent 60.

At 211, the lottery ticket sales facilitation agent 60 initiates a wait timer 62 (e.g., one second, two, seconds, three seconds, or some portions thereof, etc.) to allow the cashier 85 enough time to properly deliver the instant win lottery tickets 35 to the consumer 90.

At 212, the cashier 85 separates the instant win lottery tickets 35 that correspond to the ticket dispense request 27 and delivers the instant win lottery tickets 35 to the consumer 90.

At 213, if the lottery ticket sales facilitation agent 60 is going to send a ticket dispense status update message 29 (which may or may not be sent depending on operational options), the lottery ticket sales facilitation agent 60 sends the ticket dispense status update message 29 to the third party 41. In an embodiment, the lottery ticket sales facilitation agent 60 sends the ticket dispense status update message 29 when triggered by an input at the point of sale 24, e.g., triggering can be via pressing a button at the point of sale 24 by a cashier 85 or the scanning of a particular machine-readable code by the cashier 85. In an embodiment, the lottery ticket sales facilitation agent 60 sends the ticket dispense status update message 29 when triggered by a timer, e.g., wait timer 62, which may begin upon the point of sale instant win lottery ticket dispenser 40 beginning its dispensing of instant win lottery tickets 35 in response to the ticket dispense request 27. In an embodiment, the lottery ticket sales facilitation agent 60 may send the ticket dispense status update message 29 only at the beginning of a next consumer's point of sale transaction when the point of sale device 25 sends the next consumer's ticket activation message 28 to the lottery ticket sales facilitation agent 60 for said next customer. Optionally, either immediately before receipt of the ticket dispense status update message 29 or following receipt of the ticket dispense status update message 29, the third party 41 will send a dispense message 48 to the lottery ticket sales facilitation agent 60 indicating the instructions it had sent (e.g., the dispense instruction 47 sent by the in-store controller 42) to the point of sale instant win lottery ticket dispenser 40, and the information contained in the dispense message 48 may be validated and stored by the lottery ticket sales facilitation agent 60.

At 214, the lottery ticket sales facilitation agent 60 sends an activation request response message 38 to the point of sale 24 for each requested instant win lottery ticket 35 (e.g., activation request response messages 38*a*, 38*b*, and 38*c*). The activation request response message 38 may be used by the retailer 80 and/or point of sale 24 to track and record activities related to instant win lottery games 20, instant win lottery tickets 35, ticket activation messages 28, ticket dispense requests 27, and or combinations thereof.

Figure 3:
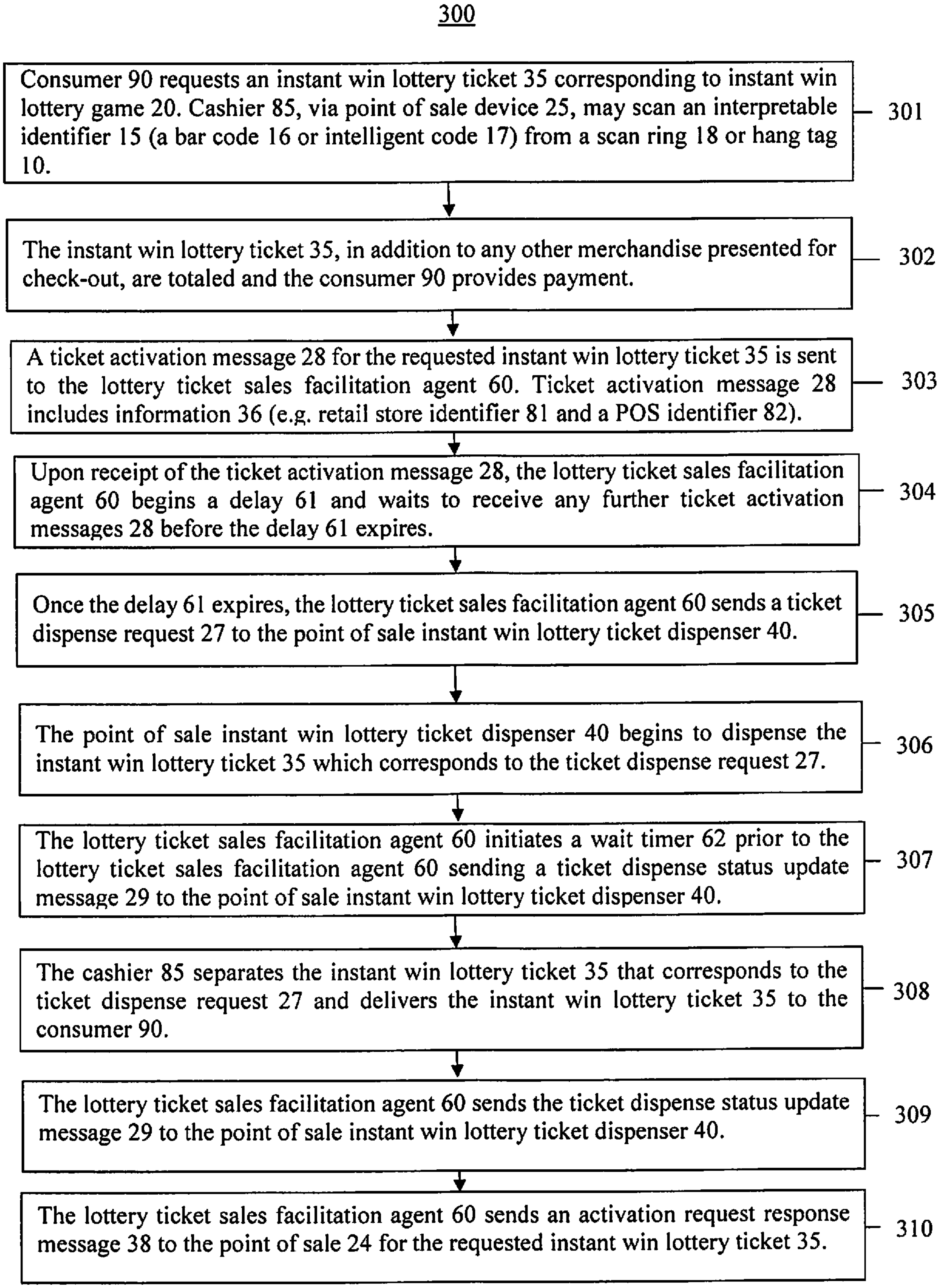
FIG. 3 is a process flow chart of an embodiment of a process for dispensing an instant win lottery ticket at an in-store check-out lane upon receipt of a consumer's selection of an instant win lottery game to play.

FIG. 3 depicts a process 300 for providing an instant win lottery ticket 35 to a consumer 90 at a retailer's point of sale check-out lane 83 in response to a consumer's selection of an instant win lottery game 20 which the consumer 90 wants to play.

At 301, a consumer 90, at a point of sale 24, asks for an instant win lottery ticket 35 corresponding to instant win lottery game 20.

In an embodiment, a cashier 85 retrieves a scan ring 18 and scans an interpretable identifier 15, e.g., a bar code 16 or intelligent code 17, corresponding to the instant win lottery game 20 asked for by the consumer 90, e.g., interpretable identifier 15 for instant win lottery game A 21 is scanned once producing ticket dispense request message 23*a*.

In an embodiment, the consumer 90 presents an instant win hang-tag 10 to the cashier 85 which contains an interpretable identifier 15, e.g., a bar code 16 or intelligent code 17, corresponding to the particular instant win lottery game 20. The scan of the bar code 16 (or intelligent code 17) on the hang tag 10 produces ticket dispense request message 23*a* for the instant win lottery game 20 associated with the particular hang tag 10.

In an embodiment, the consumer 90 presents an image 55 (displayed on consumer's device 50) to the cashier 85 which contains an interpretable identifier 15, e.g., a bar code 16 or intelligent code 17, corresponding to the particular instant win lottery game 20. The scan of the bar code 16 (or intelligent code 17) produces ticket dispense request message 23*a* for the instant win lottery game 20 associated with the image 55.

In an embodiment, the consumer 90, via the consumer's device 50, electronically conveys information 91 corresponding to the particular instant win lottery game 20 directly to the point of sale device 25, e.g., via NFC communication, Bluetooth communication, or other known methods for engaging a point of sale device 25 for information reception. The conveyance of information 91 results in the ticket dispense request message 23*a*.

At 302, the cost of the instant win lottery ticket 35 to be purchased, in addition to any other merchandise presented for check-out, are totaled and the consumer 90 provides payment.

At 303, immediately, following a successful payment, a device at the point of sale 24 is programmed to send a ticket activation message 28 for the requested instant win lottery ticket 35 to the lottery ticket sales facilitation agent 60 for the ticket dispense request message 23*a* it has processed. The ticket activation message 28 will include information 36 identifying the instant win lottery ticket 35 to be dispensed (e.g., information from ticket dispense request message 23*a*), a retail store identifier 81 and a POS identifier 82.

At 304, upon receipt of the ticket activation message 28, the lottery ticket sales facilitation agent 60 begins a delay 61 (e.g., one second, two, seconds, three seconds, or some portions thereof, etc.), and waits to receive any further ticket activation messages 28 before the delay 61 expires.

At 305, once the delay 61 expires, the lottery ticket sales facilitation agent 60 sends a ticket dispense request 27 to the point of sale instant win lottery ticket dispenser 40. The ticket dispense request 27 may comprise some or all of information 36 contained in the step at 303 along with other types of data.

At 306, the point of sale instant win lottery ticket dispenser 40 begins to dispense the instant win lottery ticket 35 which corresponds to the ticket dispense request 27.

At 307, the lottery ticket sales facilitation agent 60 initiates a wait timer 62 (e.g., one second, two, seconds, three seconds, or some portions thereof, etc.) to allow the cashier 85 enough time to properly deliver the instant win lottery ticket 35 to the consumer 90 prior to the lottery ticket sales facilitation agent 60 sending a ticket dispense status update message 29 to the point of sale instant win lottery ticket dispenser 40.

At 308, the cashier 85 separates the instant win lottery ticket 35 that corresponds to the ticket dispense request 27 and delivers the instant win lottery ticket 35 to the consumer 90.

At 309, the lottery ticket sales facilitation agent 60 sends the ticket dispense status update message 29 to the point of sale instant win lottery ticket dispenser 40. In an embodiment, the lottery ticket sales facilitation agent 60 sends the ticket dispense status update message 29 when triggered by an input at the point of sale 24, e.g., triggering can be via pressing a button at the point of sale 24 by a cashier 85 or the scanning of a particular machine-readable code by the cashier 85. In an embodiment, the lottery ticket sales facilitation agent 60 sends the ticket dispense status update message 29 when triggered by a timer, e.g., wait timer 62, which may begin upon the point of sale instant win lottery ticket dispenser 40 beginning its dispensing of the instant win lottery ticket 35 in response to the ticket dispense request 27. In an embodiment, the lottery ticket sales facilitation agent 60 may send the ticket dispense status update message 29 only at the beginning of a next consumer's point of sale transaction when the point of sale device 25 sends the next consumer's ticket activation message 28 to the lottery ticket sales facilitation agent 60 for said next customer.

At 310, the lottery ticket sales facilitation agent 60 sends an activation request response message 38 to the point of sale 24 for the requested instant win lottery ticket 35. The activation request response message 38 may be used by the retailer 80 and/or point of sale 24 to track and record activities related to instant win lottery games 20, instant win lottery tickets 35, ticket activation messages 28, ticket dispense requests 27, and or combinations thereof.

Figure 4:
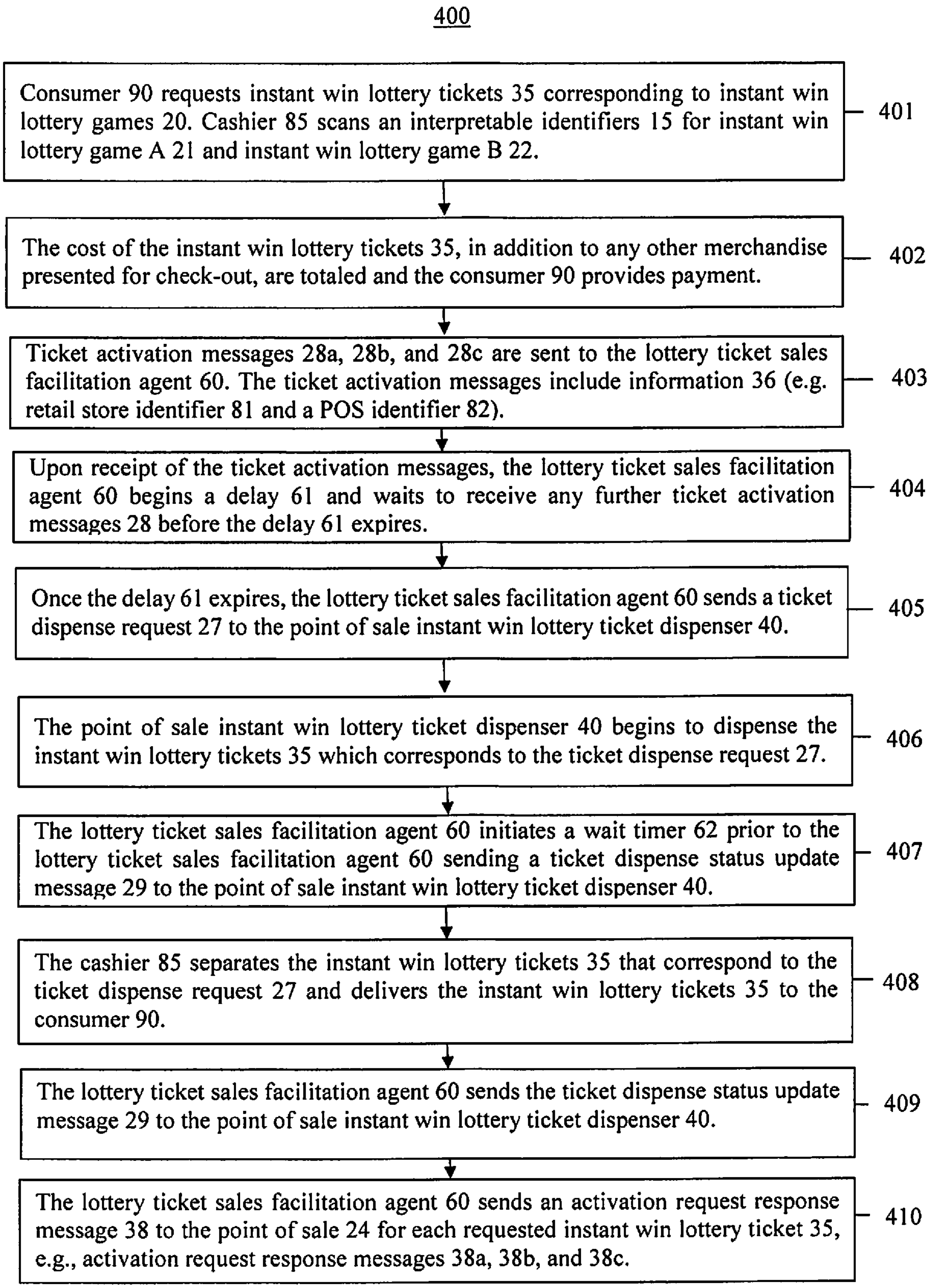
FIG. 4 is a process flow chart of an embodiment of a process for dispensing instant win lottery tickets at an in-store check-out lane upon receipt of a consumer's selection of instant win lottery games to play.

FIG. 4 depicts a process 400 for providing instant win lottery tickets 35 to a consumer 90 at a retailer's point of sale check-out lane 83 in response to a consumer's selection of several instant win lottery games 20 which the consumer 90 wants to play.

At 401, a consumer 90, at a point of sale 24, asks for instant win lottery tickets 35 corresponding to instant win lottery games 20, i.e., the consumer 90 asks for two instant win lottery tickets 35 for instant win lottery game A 21 and one instant win lottery ticket 35 for instant win lottery game B 22.

In an embodiment, a cashier 85 retrieves a scan ring 18 and scans an interpretable identifier 15, e.g., a bar code 16 or intelligent code 17, corresponding to each of the instant win lottery games 20 asked for by the consumer 90, e.g., interpretable identifier 15 for instant win lottery game A 21 is scanned twice producing two ticket dispense request messages (e.g., 23*a* and 23*b*) and interpretable identifier 15 for instant win lottery game B 22 is scanned once producing one ticket dispense request message (e.g., 23*c*).

In an embodiment, the consumer 90 presents an instant win hang-tag 10 to the cashier 85 which contains an interpretable identifier 15, e.g., a bar code 16 or intelligent code 17, corresponding to each particular instant win lottery game 20, e.g. instant win lottery game A 21 and instant win lottery game B 22. Each scan of the bar code 16 (or intelligent code 17) on the respective hang tags 10 produces a ticket dispense request message (e.g., 23*a*, 23*b*, and 23*c*) for the instant win lottery game 20 associated with the particular hang tag 10.

In an embodiment, the consumer 90 presents an image 55 (displayed on consumer's device 50) to the cashier 85 which contains an interpretable identifier 15, e.g., a bar code 16 or intelligent code 17, corresponding to a particular instant win lottery game 20. Each scan of the bar code 16 (or intelligent code 17) produces a ticket dispense request message (e.g., messages 23*a* and 23*b* for a scan of image 55*a* which corresponds to instant win lottery game A 21 or message 23*c* for a scan of image 55*b* which corresponds to instant win lottery game B 22) for the instant win lottery game 20 associated with the particular image 55. For example, the consumer could display image 55*a* corresponding to instant win lottery game A 21 and then display an image 55*b* corresponding to instant win lottery game B 22.

In an embodiment, the consumer 90, via the consumer's device 50, electronically conveys information 91 corresponding to a particular instant win lottery game 20 directly to the point of sale device 25, e.g., via NFC communication, Bluetooth communication, or other known methods for engaging a point of sale device 25 for information reception. Each conveyance of information 91 results in a ticket dispense request message (e.g., 23*a*, 23*b*, and 23*c*). For example, the consumer could convey information 91 corresponding to instant win lottery game A 21 and then convey information 91 corresponding to instant win lottery game B 22.

At 402, the cost of the instant win lottery tickets 35 to be purchased, in addition to any other merchandise presented for check-out, are totaled and the consumer 90 provides payment.

At 403, immediately, following a successful payment, a device at the point of sale 24 is programmed to send a ticket activation message 28 for each requested instant win lottery ticket 35 to the lottery ticket sales facilitation agent 60 for each ticket dispense request message (e.g., 23*a*, 23*b*, and 23*c*) it has processed. Each ticket activation message 28 will include information 36 identifying the instant win lottery ticket 35 to be dispensed (e.g., information from ticket dispense request messages 23*a*, 23*b*, and 23*c*), a retail store identifier 81, and a POS identifier 82.

At 404, upon receipt of the first ticket activation message 28 (e.g., message 28*a*), the lottery ticket sales facilitation agent 60 begins a delay 61 (e.g., one second, two, seconds, three seconds, or some portions thereof, etc.), and waits to receive any further ticket activation messages 28 before the delay 61 expires.

At 405, once the delay 61 expires, the lottery ticket sales facilitation agent 60 sends a ticket dispense request 27 to the point of sale instant win lottery ticket dispenser 40. The ticket dispense request 27 may comprise some or all of information 36 contained in the step at 403 along with other types of data.

At 406, the point of sale instant win lottery ticket dispenser 40 begins to dispense instant win lottery tickets 35 which correspond to the ticket dispense request 27.

At 407, the lottery ticket sales facilitation agent 60 initiates a wait timer 62 (e.g., one second, two, seconds, three seconds, or some portions thereof, etc.) to allow the cashier 85 enough time to properly deliver the instant win lottery tickets 35 to the consumer 90 prior to the lottery ticket sales facilitation agent 60 sending the ticket dispense status update message 29 to the point of sale instant win lottery ticket dispenser 40.

At 408, the cashier 85 separates the instant win lottery tickets 35 that correspond to the ticket dispense request 27 and delivers the instant win lottery tickets 35 to the consumer 90.

At 409, the lottery ticket sales facilitation agent 60 sends the ticket dispense status update message 29 to the point of sale instant win lottery ticket dispenser 40. In an embodiment, the lottery ticket sales facilitation agent 60 sends the ticket dispense status update message 29 when triggered by an input at the point of sale 24, e.g., triggering can be via pressing a button at the point of sale 24 by a cashier 85 or the scanning of a particular machine-readable code by the cashier 85. In an embodiment, the lottery ticket sales facilitation agent 60 sends the ticket dispense status update message 29 when triggered by a timer, e.g., wait timer 62, which may begin upon the point of sale instant win lottery ticket dispenser 40 beginning its dispensing of instant win lottery tickets 35 in response to the ticket dispense request 27. In an embodiment, the lottery ticket sales facilitation agent 60 may send the ticket dispense status update message 29 only at the beginning of a next consumer's point of sale transaction when the point of sale device 25 sends the next consumer's ticket activation message 28 to the lottery ticket sales facilitation agent 60 for said next customer.

At 410, the lottery ticket sales facilitation agent 60 sends an activation request response message 38 to the point of sale 24 for each requested instant win lottery ticket 35 (e.g., activation request response messages 38*a*, 38*b*, and 38*c*). The activation request response message 38 may be used by the retailer 80 and/or point of sale 24 to track and record activities related to instant win lottery games 20, instant win lottery tickets 35, ticket activation messages 28, ticket dispense requests 27, and or combinations thereof.

Figure 5:
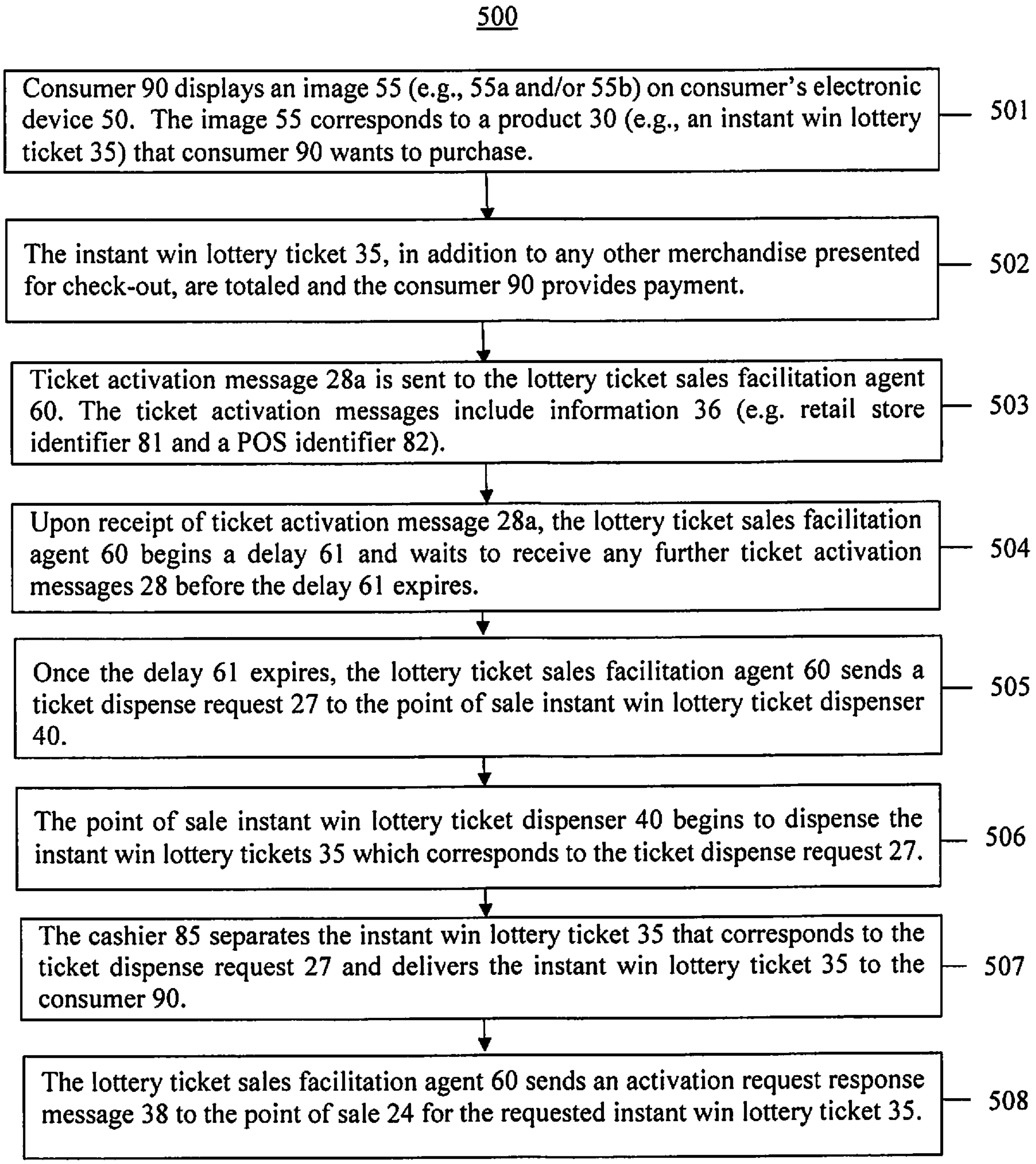
FIG. 5 is a process flow chart of an embodiment of a process for dispensing an instant win lottery ticket at an in-store check-out lane upon receipt of a consumer's selection of an instant win lottery game to play.

FIG. 5 depicts a process 500 for providing an instant win lottery ticket 35 to a consumer 90 at a retailer's point of sale check-out lane 83 in response to a consumer's selection of an instant win lottery game 20 which the consumer 90 wants to play.

At 501, a consumer 90, at a point of sale 24, asks for an instant win lottery ticket 35 corresponding to instant win lottery game 20.

In an embodiment, a cashier 85 retrieves a scan ring 18 and scans an interpretable identifier 15, e.g., a bar code 16 or intelligent code 17, corresponding to the instant win lottery game 20 asked for by the consumer 90, e.g., interpretable identifier 15 for instant win lottery game A 21 is scanned once producing ticket dispense request message 23*a*.

In an embodiment, the consumer 90 presents an instant win hang-tag 10 to the cashier 85 which contains an interpretable identifier 15, e.g., a bar code 16 or intelligent code 17, corresponding to the particular instant win lottery game 20. The scan of the bar code 16 (or intelligent code 17) on the hang tag 10 produces ticket dispense request message 23*a* for the instant win lottery game 20 associated with the particular hang tag 10.

In an embodiment, the consumer 90 presents an image 55 (displayed on consumer's device 50) to the cashier 85 which contains an interpretable identifier 15, e.g., a bar code 16 or intelligent code 17, corresponding to the particular instant win lottery game 20. The scan of the bar code 16 (or intelligent code 17) produces ticket dispense request message 23*a* for the instant win lottery game 20 associated with the image 55.

In an embodiment, the consumer 90, via the consumer's device 50, electronically conveys information 91 corresponding to the particular instant win lottery game 20 directly to the point of sale device 25, e.g., via NFC communication, Bluetooth communication, or other known methods for engaging a point of sale device 25 for information reception. The conveyance of information 91 results in ticket dispense request message 23*a*.

At 502, the cost of the instant win lottery ticket 35 to be purchased, in addition to any other merchandise presented for check-out, are totaled and the consumer 90 provides payment.

At 503, immediately, following a successful payment, a device at the point of sale 24 is programmed to send a ticket activation message 28 for the requested instant win lottery ticket 35 to the lottery ticket sales facilitation agent 60 for the ticket dispense request message 23*a* it has processed. The ticket activation message 28 will include information 36 identifying the instant win lottery ticket 35 to be dispensed (e.g., information from ticket dispense request message 23*a*), a retail store identifier 81 and a POS identifier 82.

At 504, upon receipt of the ticket activation message 28, the lottery ticket sales facilitation agent 60 begins a delay 61 (e.g., one second, two, seconds, three seconds, or some portions thereof, etc.), and waits to receive any further ticket activation messages 28 before the delay 61 expires.

At 505, once the delay 61 expires, the lottery ticket sales facilitation agent 60 sends a ticket dispense request 27 to the point of sale instant win lottery ticket dispenser 40. The ticket dispense request 27 may comprise some or all of information 36 contained in the step at 503 along with other types of data.

At 506, the point of sale instant win lottery ticket dispenser 40 begins to dispense the instant win lottery ticket 35 which corresponds to the ticket dispense request 27.

At 507, the cashier 85 separates the instant win lottery ticket 35 that corresponds to the ticket dispense request 27 and delivers the instant win lottery ticket 35 to the consumer 90.

At 508, the lottery ticket sales facilitation agent 60 sends an activation request response message 38 to the point of sale 24 for the requested instant win lottery ticket 35. The activation request response message 38 may be used by the retailer 80 and/or point of sale 24 to track and record activities related to instant win lottery games 20, instant win lottery tickets 35, ticket activation messages 28, ticket dispense requests 27, and or combinations thereof.

Figure 6:
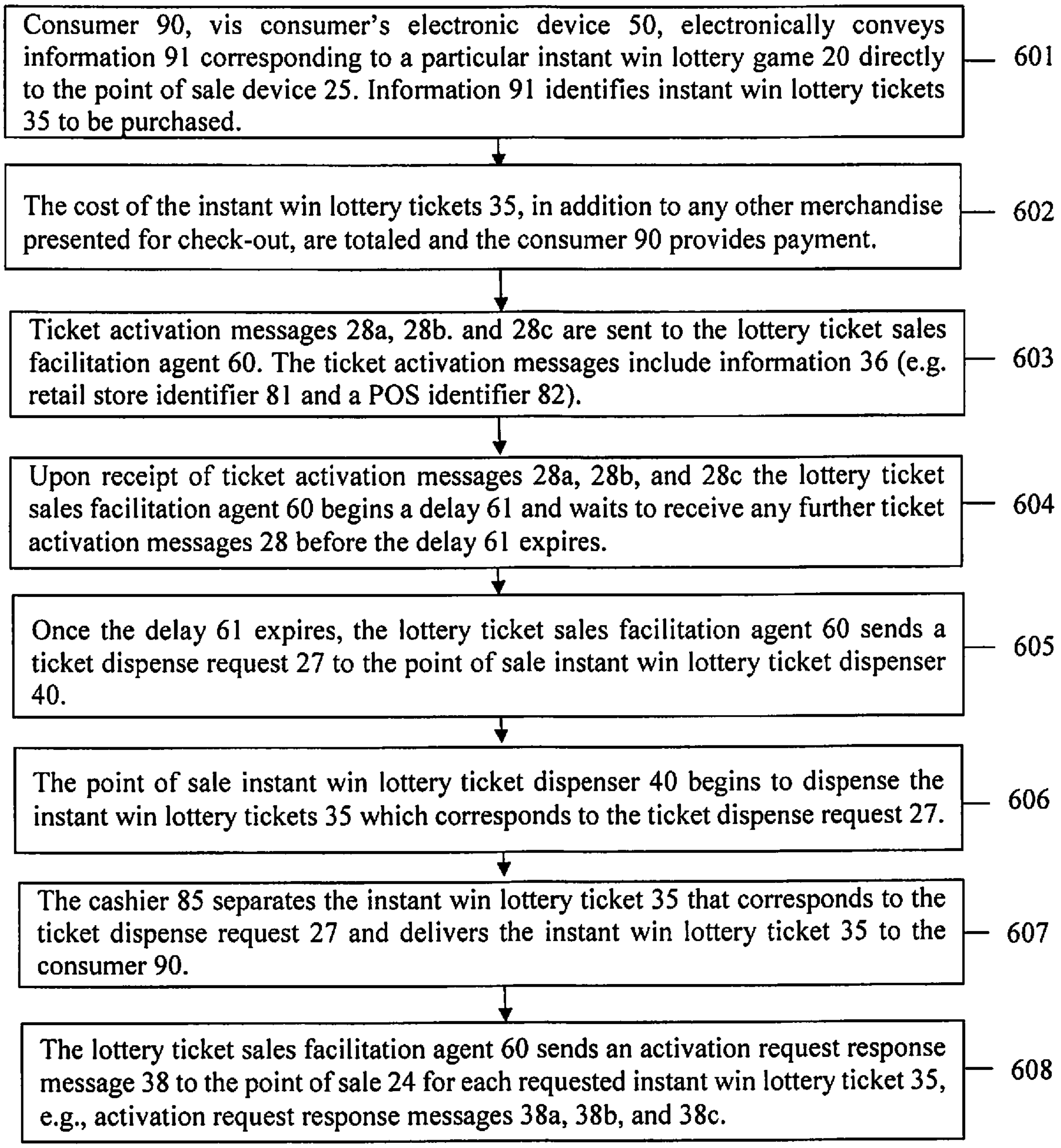
FIG. 6 is a process flow chart of an embodiment of a process for dispensing instant win lottery tickets at an in-store check-out lane upon receipt of a consumer's selection of instant win lottery games to play.

FIG. 6 depicts a process 600 for providing instant win lottery tickets 35 to a consumer 90 at a retailer's point of sale check-out lane 83 in response to a consumer's selection of several instant win lottery games 20 which the consumer 90 wants to play.

At 601, a consumer 90, at a point of sale 24, asks for instant win lottery tickets 35 corresponding to instant win lottery games 20, i.e., the consumer 90 asks for two instant win lottery tickets 35 for instant win lottery game A 21 and one instant win lottery ticket 35 for instant win lottery game B 22.

In an embodiment, a cashier 85 retrieves a scan ring 18 and scans an interpretable identifier 15, e.g., a bar code 16 or intelligent code 17, corresponding to each of the instant win lottery games 20 asked for by the consumer 90, e.g., interpretable identifier 15 for instant win lottery game A 21 is scanned twice producing two ticket dispense request messages (e.g., 23*a* and 23*b*) and interpretable identifier 15 for instant win lottery game B 22 is scanned once producing one ticket dispense request message (e.g., 23*c*).

In an embodiment, the consumer 90 presents an instant win hang-tag 10 to the cashier 85 which contains an interpretable identifier 15, e.g., a bar code 16 or intelligent code 17, corresponding to each particular instant win lottery game 20, e.g. instant win lottery game A 21 and instant win lottery game B 22. Each scan of the bar code 16 (or intelligent code 17) on the respective hang tags 10 produces a ticket dispense request message (e.g., 23*a*, 23*b*, and 23*c*) for the instant win lottery game 20 associated with the particular hang tag 10.

In an embodiment, the consumer 90 presents an image 55 (displayed on consumer's device 50) to the cashier 85 which contains an interpretable identifier 15, e.g., a bar code 16 or intelligent code 17, corresponding to a particular instant win lottery game 20. Each scan of the bar code 16 (or intelligent code 17) produces a ticket dispense request message (e.g., messages 23*a* and 23*b* for a scan of image 55*a* which corresponds to instant win lottery game A 21 or message 23*c* for a scan of image 55*b* which corresponds to instant win lottery game B 22) for the instant win lottery game 20 associated with the particular image 55. For example, the consumer could display image 55*a* corresponding to instant win lottery game A 21 and then display an image 55*b* corresponding to instant win lottery game B 22.

In an embodiment, the consumer 90, via the consumer's device 50, electronically conveys information 91 corresponding to a particular instant win lottery game 20 directly to the point of sale device 25, e.g., via NFC communication, Bluetooth communication, or other known methods for engaging a point of sale device 25 for information reception. Each conveyance of information 91 results in a ticket dispense request message (e.g., 23*a*, 23*b*, and 23*c*). For example, the consumer could convey information 91 corresponding to instant win lottery game A 21 and then convey information 91 corresponding to instant win lottery game B 22.

At 602, the cost of the instant win lottery tickets 35 to be purchased, in addition to any other merchandise presented for check-out, are totaled and the consumer 90 provides payment.

At 603, immediately, following a successful payment, a device at the point of sale 24 is programmed to send a ticket activation message 28 for each requested instant win lottery ticket 35 to the lottery ticket sales facilitation agent 60 for each ticket dispense message (e.g., 23*a*, 23*b*, and 23*c*) it has processed. Each ticket activation message 28 will include information 36 identifying the instant win lottery ticket 35 to be dispensed (e.g., information from ticket dispense request messages 23*a*, 23*b*, and 23*c*), a retail store identifier 81, and a POS identifier 82.

At 604, upon receipt of the first ticket activation message 28 (e.g., message 28*a*), the lottery ticket sales facilitation agent 60 begins a delay 61 (e.g., one second, two, seconds, three seconds, or some portions thereof, etc.), and waits to receive any further ticket activation messages 28 before the delay 61 expires.

At 605, once the delay 61 expires, the lottery ticket sales facilitation agent 60 sends a ticket dispense request 27 to the point of sale instant win lottery ticket dispenser 40. The ticket dispense request 27 may comprise some or all of information 36 contained in the step at 603 along with other types of data.

At 606, the point of sale instant win lottery ticket dispenser 40 begins to dispense instant win lottery tickets 35 which correspond to the ticket dispense request 27.

At 607, the cashier 85 separates the instant win lottery tickets 35 that correspond to the ticket dispense request 27 and delivers the instant win lottery tickets 35 to the consumer 90.

At 608, the lottery ticket sales facilitation agent 60 sends an activation request response message 38 to the point of sale 24 for each requested instant win lottery ticket 35 (e.g., activation request response messages 38*a*, 38*b*, and 38*c*). The activation request response message 38 may be used by the retailer 80 and/or point of sale 24 to track and record activities related to instant win lottery games 20, instant win lottery tickets 35, ticket activation messages 28, ticket dispense requests 27, and or combinations thereof.

Figure 7:
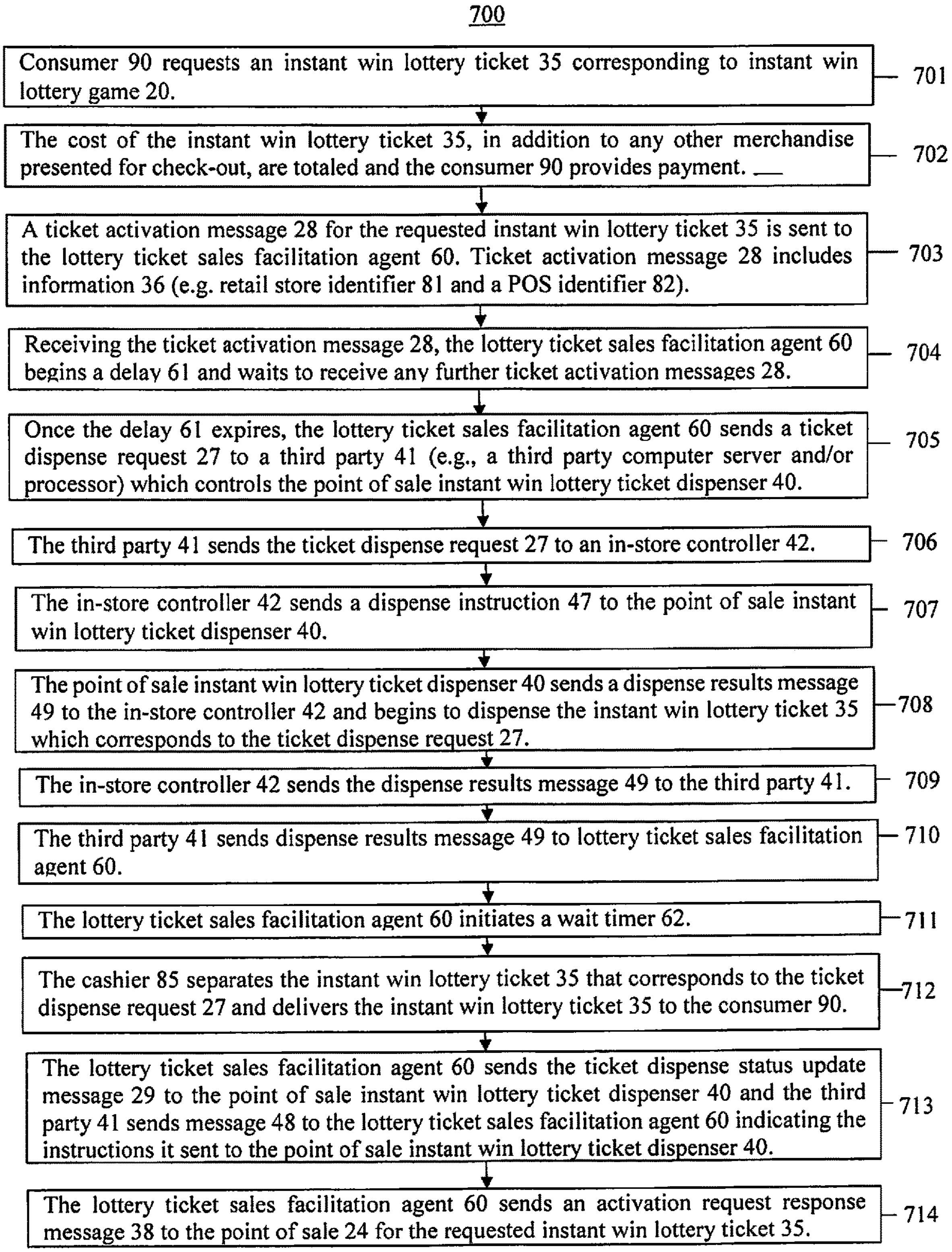
FIG. 7 is a process flow chart of an embodiment of a process for dispensing an instant win lottery ticket at an in-store check-out lane upon receipt of a consumer's selection of an instant win lottery game to play.

FIG. 7 depicts a process 700 for providing an instant win lottery ticket 35 to a consumer 90 at a retailer's point of sale check-out lane 83 in response to a consumer's selection of an instant win lottery game 20 which the consumer 90 wants to play.

At 701, a consumer 90, at a point of sale 24, asks for an instant win lottery ticket 35 corresponding to instant win lottery game 20.

In an embodiment, a cashier 85 retrieves a scan ring 18 and scans an interpretable identifier 15, e.g., a bar code 16 or intelligent code 17, corresponding to the instant win lottery game 20 asked for by the consumer 90, e.g., interpretable identifier 15 for instant win lottery game A 21 is scanned producing ticket dispense requests message 23*a*.

In an embodiment, the consumer 90 presents an instant win hang-tag 10 to the cashier 85 which contains an interpretable identifier 15, e.g., a bar code 16 or intelligent code 17, corresponding to the particular instant win lottery game 20. The scan of the bar code 16 (or intelligent code 17) on the hang tag 10 produces ticket dispense request message 23*a* for the instant win lottery game 20 associated with the particular hang tag 10.

In an embodiment, the consumer 90 presents an image 55 (displayed on consumer's device 50) to the cashier 85 which contains an interpretable identifier 15, e.g., a bar code 16 or intelligent code 17, corresponding to the particular instant win lottery game 20. The scan of the bar code 16 (or intelligent code 17) produces ticket dispense request message 23*a* for the instant win lottery game 20 associated with the image 55.

In an embodiment, the consumer 90, via the consumer's device 50, electronically conveys information 91 corresponding to the particular instant win lottery game 20 directly to the point of sale device 25, e.g., via NFC communication, Bluetooth communication, or other known methods for engaging a point of sale device 25 for information reception. The conveyance of information 91 results in the ticket dispense request message 23*a*.

At 702, the cost of the instant win lottery ticket 35 to be purchased, in addition to any other merchandise presented for check-out, are totaled and the consumer 90 provides payment.

At 703, immediately, following a successful payment, a device at the point of sale 24 is programmed to send a ticket activation message 28 for the requested instant win lottery ticket 35 to the lottery ticket sales facilitation agent 60 for the ticket dispense request message 23*a* it has processed. The ticket activation message 28 will include information 36 identifying the instant win lottery ticket 35 to be dispensed (e.g., information from ticket dispense request message 23*a*), a retail store identifier 81, and a POS identifier 82.

At 704, upon receipt of the ticket activation message 28, the lottery ticket sales facilitation agent 60 begins a delay 61 (e.g., one second, two, seconds, three seconds, or some portions thereof, etc.), and waits to receive any further ticket activation messages 28 before the delay 61 expires.

At 705, once the delay 61 expires, the lottery ticket sales facilitation agent 60 sends a ticket dispense request 27 to a third party 41 (e.g., a third party computer server and/or processor) which controls the point of sale instant win lottery ticket dispenser 40. The ticket dispense request 27 may comprise some or all of information 36 contained in the step at 703 along with other types of data.

At 706, the third party 41 sends the ticket dispense request 27 to an in-store controller 42 (which may communicate with a plurality of point of sale instant win lottery ticket dispensers 40 located in various different retail locations).

At 707, the in-store controller 42 sends a dispense instruction 47 to the point of sale instant win lottery ticket dispenser 40.

At 708, the point of sale instant win lottery ticket dispenser 40 sends a dispense results message 49 to the in-store controller 42 and begins to dispense the instant win lottery ticket 35 which corresponds to the ticket dispense request 27.

At 709, the in-store controller 42 sends the dispense results message 49 to the third party 41.

At 710, the third party sends the dispense results message 49 to the lottery ticket sales facilitation agent 60.

At 711, the lottery ticket sales facilitation agent 60 initiates a wait timer 62 (e.g., one second, two, seconds, three seconds, or some portions thereof, etc.) to allow the cashier 85 enough time to properly deliver the instant win lottery ticket 35 to the consumer 90 prior to the lottery ticket sales facilitation agent 60 sending the ticket dispense status update message 29 to the point of sale instant win lottery ticket dispenser 40.

At 712, the cashier 85 separates the instant win lottery ticket 35 that corresponds to the ticket dispense request 27 and delivers the instant win lottery ticket 35 to the consumer 90.

At 713, the lottery ticket sales facilitation agent 60 sends a ticket dispense status update message 29 to the third party 41. In an embodiment, the lottery ticket sales facilitation agent 60 sends the ticket dispense status update message 29 when triggered by an input at the point of sale 24, e.g., triggering can be via pressing a button at the point of sale 24 by a cashier 85 or the scanning of a particular machine-readable code by the cashier 85. In an embodiment, the lottery ticket sales facilitation agent 60 sends the ticket dispense status update message 29 when triggered by a timer, e.g., wait timer 62, which may begin upon the point of sale instant win lottery ticket dispenser 40 beginning its dispensing of instant win lottery tickets 35 in response to the ticket dispense request 27. In an embodiment, the lottery ticket sales facilitation agent 60 may send the ticket dispense status update message 29 only at the beginning of a next consumer's point of sale transaction when the point of sale device 25 sends the next consumer's ticket activation message 28 to the lottery ticket sales facilitation agent 60 for said next customer. Optionally, either immediately before receipt of the ticket dispense status update message 29 or following receipt of the ticket dispense status update message 29, the third party 41 will send a dispense message 48 to the lottery ticket sales facilitation agent 60 indicating the instructions it had sent (e.g., the dispense instruction 47 sent by the in-store controller 42) to the point of sale instant win lottery ticket dispenser 40, and the information contained in the dispense message 48 may be validated and stored by the lottery ticket sales facilitation agent 60.

At 714, the lottery ticket sales facilitation agent 60 sends an activation request response message 38 to the point of sale 24 for the requested instant win lottery ticket 35. The activation request response message 38 may be used by the retailer 80 and/or point of sale 24 to track and record activities related to instant win lottery games 20, instant win lottery tickets 35, ticket activation messages 28, ticket dispense requests 27, and or combinations thereof.

Figure 8:
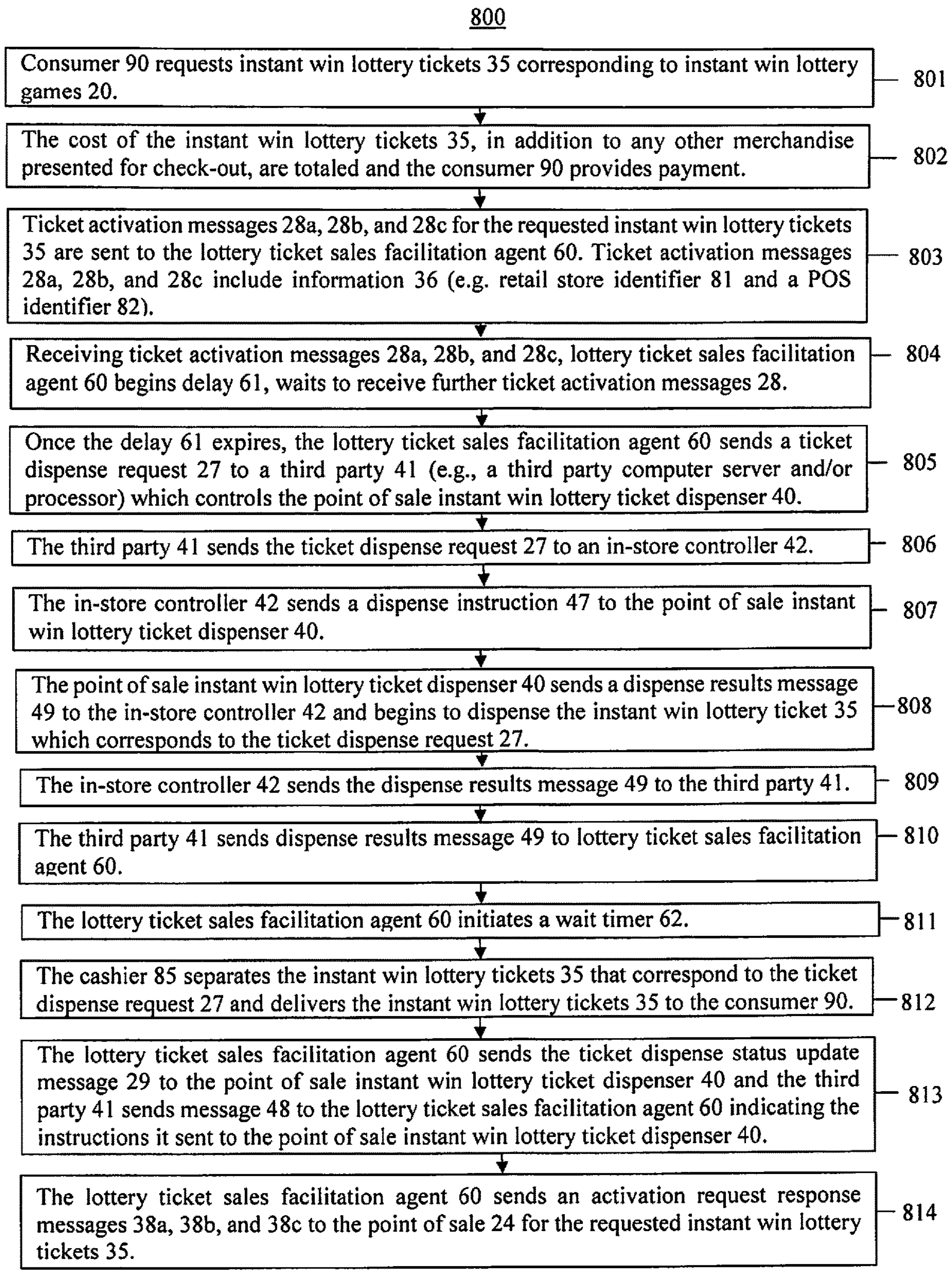
FIG. 8 is a process flow chart of an embodiment of a process for dispensing instant win lottery tickets at an in-store check-out lane upon receipt of a consumer's selection of instant win lottery games to play.

FIG. 8 depicts a process 800 for providing instant win lottery tickets 35 to a consumer 90 at a retailer's point of sale check-out lane 83 in response to a consumer's selection of several instant win lottery games 20 which the consumer 90 wants to play.

At 801, a consumer 90, at a point of sale 24, asks for instant win lottery tickets 35 corresponding to instant win lottery games 20, i.e., the consumer 90 asks for two instant win lottery tickets 35 for instant win lottery game A 21 and one instant win lottery ticket 35 for instant win lottery game B 22.

In an embodiment, a cashier 85 retrieves a scan ring 18 and scans an interpretable identifier 15, e.g., a bar code 16 or intelligent code 17, corresponding to each of the instant win lottery games 20 asked for by the consumer 90, e.g., interpretable identifier 15 for instant win lottery game A 21 is scanned twice producing two ticket dispense requests messages (e.g., 23*a* and 23*b*) and interpretable identifier 15 for instant win lottery game B 22 is scanned once producing one ticket dispense request message (e.g., 23*c*).

In an embodiment, the consumer 90 presents an instant win hang-tag 10 to the cashier 85 which contains an interpretable identifier 15, e.g., a bar code 16 or intelligent code 17, corresponding to each particular instant win lottery game 20, e.g. instant win lottery game A 21 and instant win lottery game B 22. Each scan of the bar code 16 (or intelligent code 17) on the respective hang tags 10 produces a ticket dispense request message (e.g., 23*a*, 23*b*, and 23*c*) for the instant win lottery game 20 associated with the particular hang tag 10.

In an embodiment, the consumer 90 presents an image 55 (displayed on consumer's device 50) to the cashier 85 which contains an interpretable identifier 15, e.g., a bar code 16 or intelligent code 17, corresponding to a particular instant win lottery game 20. Each scan of the bar code 16 (or intelligent code 17) produces a ticket dispense request message (e.g., messages 23*a* and 23*b* for a scan of image 55*a* which corresponds to instant win lottery game A 21 or message 23*c* for a scan of image 55*b* which corresponds to instant win lottery game B 22) for the instant win lottery game 20 associated with the particular image 55. For example, the consumer could display image 55*a* corresponding to instant win lottery game A 21 and then display an image 55*b* corresponding to instant win lottery game B 22.

In an embodiment, the consumer 90, via the consumer's device 50, electronically conveys information 91 corresponding to a particular instant win lottery game 20 directly to the point of sale device 25, e.g., via NFC communication, Bluetooth communication, or other known methods for engaging a point of sale device 25 for information reception. Each conveyance of information 91 results in a ticket dispense request message (e.g., 23*a*, 23*b*, and 23*c*). For example, the consumer could convey information 91 corresponding to instant win lottery game A 21 and then convey information 91 corresponding to instant win lottery game B 22.

At 802, the cost of the instant win lottery tickets 35 to be purchased, in addition to any other merchandise presented for check-out, are totaled and the consumer 90 provides payment.

At 803, immediately, following a successful payment, a device at the point of sale 24 is programmed to send a ticket activation message 28 for each requested instant win lottery ticket 35 to the lottery ticket sales facilitation agent 60 for each ticket dispense request message (e.g., 23*a*, 23*b*, and 23*c*) it has processed. Each ticket activation message 28 will include information 36 identifying the instant win lottery ticket 35 to be dispensed (e.g., information from ticket dispense request messages 23*a*, 23*b*, and 23*c*), a retail store identifier 81, and a POS identifier 82.

At 804, upon receipt of the first ticket activation message 28 (e.g., message 28*a*), the lottery ticket sales facilitation agent 60 begins a delay 61 (e.g., one second, two, seconds, three seconds, or some portions thereof, etc.), and waits to receive any further ticket activation messages 28 before the delay 61 expires.

At 805, once the delay 61 expires, the lottery ticket sales facilitation agent 60 sends a ticket dispense request 27 to a third party 41 (e.g., a third party computer server and/or processor) which controls the point of sale instant win lottery ticket dispenser 40. The ticket dispense request 27 may comprise some or all of information 36 contained in the step at 803 along with other types of data.

At 806, the third party 41 sends the ticket dispense request 27 to an in-store controller 42 (which may communicate with a plurality of point of sale instant win lottery ticket dispensers 40 located in various different retail locations).

At 807, the in-store controller 42 sends a dispense instruction 47 to the point of sale instant win lottery ticket dispenser 40.

At 808, the point of sale instant win lottery ticket dispenser 40 sends a dispense results message 49 to the in-store controller 42 and begins to dispense the instant win lottery tickets 35 which correspond to the ticket dispense request 27.

At 809, the in-store controller 42 sends the dispense results message 49 to the third party 41.

At 810, the third party sends the dispense results message 49 to the lottery ticket sales facilitation agent 60.

At 811, the lottery ticket sales facilitation agent 60 initiates a wait timer 62 (e.g., one second, two, seconds, three seconds, or some portions thereof, etc.) to allow the cashier 85 enough time to properly deliver the instant win lottery tickets 35 to the consumer 90 prior to the lottery ticket sales facilitation agent 60 sending the ticket dispense status update message 29 to the point of sale instant win lottery ticket dispenser 40.

At 812, the cashier 85 separates the instant win lottery tickets 35 that correspond to the ticket dispense request 27 and delivers the instant win lottery tickets 35 to the consumer 90.

At 813, the lottery ticket sales facilitation agent 60 sends a ticket dispense status update message 29 to the third party 41. In an embodiment, the lottery ticket sales facilitation agent 60 sends the ticket dispense status update message 29 when triggered by an input at the point of sale 24, e.g., triggering can be via pressing a button at the point of sale 24 by a cashier 85 or the scanning of a particular machine-readable code by the cashier 85. In an embodiment, the lottery ticket sales facilitation agent 60 sends the ticket dispense status update message 29 when triggered by a timer, e.g., wait timer 62, which may begin upon the point of sale instant win lottery ticket dispenser 40 beginning its dispensing of instant win lottery tickets 35 in response to the ticket dispense request 27. In an embodiment, the lottery ticket sales facilitation agent 60 may send the ticket dispense status update message 29 only at the beginning of a next consumer's point of sale transaction when the point of sale device 25 sends the next consumer's ticket activation message 28 to the lottery ticket sales facilitation agent 60 for said next customer. Optionally, either immediately before receipt of the ticket dispense status update message 29 or following receipt of the ticket dispense status update message 29, the third party 41 will send a dispense message 48 to the lottery ticket sales facilitation agent 60 indicating the instructions it had sent (e.g., the dispense instruction 47 sent by the in-store controller 42) to the point of sale instant win lottery ticket dispenser 40, and the information contained in the dispense message 48 may be validated and stored by the lottery ticket sales facilitation agent 60.

At 814, the lottery ticket sales facilitation agent 60 sends an activation request response message 38 to the point of sale 24 for each requested instant win lottery ticket 35 (e.g., activation request response messages 38*a*, 38*b*, and 38*c*). The activation request response message 38 may be used by the retailer 80 and/or point of sale 24 to track and record activities related to instant win lottery games 20, instant win lottery tickets 35, ticket activation messages 28, ticket dispense requests 27, and or combinations thereof.

Figure 9:
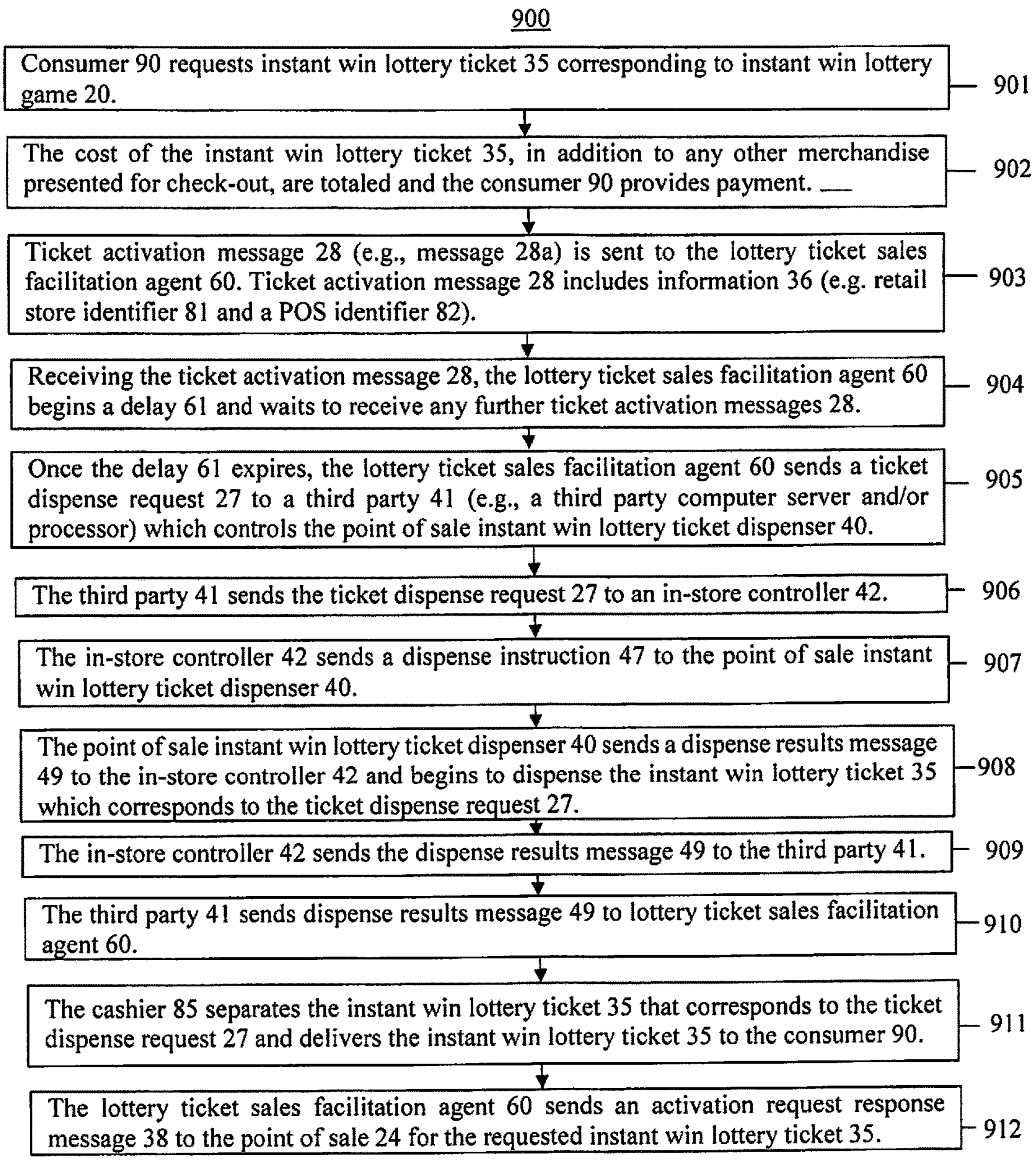
FIG. 9 is a process flow chart of an embodiment of a process for dispensing an instant win lottery ticket at an in-store check-out lane upon receipt of a consumer's selection of an instant win lottery game to play.

FIG. 9 depicts a process 900 for providing an instant win lottery ticket 35 to a consumer 90 at a retailer's point of sale check-out lane 83 in response to a consumer's selection of an instant win lottery game 20 which the consumer 90 wants to play.

At 901, a consumer 90, at a point of sale 24, asks for an instant win lottery ticket 35 corresponding to instant win lottery game 20.

In an embodiment, a cashier 85 retrieves a scan ring 18 and scans an interpretable identifier 15, e.g., a bar code 16 or intelligent code 17, corresponding to the instant win lottery game 20 asked for by the consumer 90, e.g., interpretable identifier 15 for instant win lottery game A 21 is scanned producing ticket dispense requests message 23*a*.

In an embodiment, the consumer 90 presents an instant win hang-tag 10 to the cashier 85 which contains an interpretable identifier 15, e.g., a bar code 16 or intelligent code 17, corresponding to the particular instant win lottery game 20. The scan of the bar code 16 (or intelligent code 17) on the hang tag 10 produces ticket dispense request message 23*a* for the instant win lottery game 20 associated with the particular hang tag 10.

In an embodiment, the consumer 90 presents an image 55 (displayed on consumer's device 50) to the cashier 85 which contains an interpretable identifier 15, e.g., a bar code 16 or intelligent code 17, corresponding to the particular instant win lottery game 20. The scan of the bar code 16 (or intelligent code 17) produces ticket dispense request message 23*a* for the instant win lottery game 20 associated with the image 55.

In an embodiment, the consumer 90, via the consumer's device 50, electronically conveys information 91 corresponding to the particular instant win lottery game 20 directly to the point of sale device 25, e.g., via NFC communication, Bluetooth communication, or other known methods for engaging a point of sale device 25 for information reception. The conveyance of information 91 results in the ticket dispense request message 23*a*.

At 902, the cost of the instant win lottery ticket 35 to be purchased, in addition to any other merchandise presented for check-out, are totaled and the consumer 90 provides payment.

At 903, immediately, following a successful payment, a device at the point of sale 24 is programmed to send a ticket activation message 28 for the requested instant win lottery ticket 35 to the lottery ticket sales facilitation agent 60 for the ticket dispense request message 23*a* it has processed. The ticket activation message 28 will include information 36 identifying the instant win lottery ticket 35 to be dispensed (e.g., information from ticket dispense request message 23*a*), a retail store identifier 81, and a POS identifier 82.

At 904, upon receipt of the ticket activation message 28, the lottery ticket sales facilitation agent 60 begins a delay 61 (e.g., one second, two, seconds, three seconds, or some portions thereof, etc.), and waits to receive any further ticket activation messages 28 before the delay 61 expires.

At 905, once the delay 61 expires, the lottery ticket sales facilitation agent 60 sends a ticket dispense request 27 to a third party 41 (e.g., a third party computer server and/or processor) which controls the point of sale instant win lottery ticket dispenser 40. The ticket dispense request 27 may comprise some or all of information 36 contained in the step at 703 along with other types of data.

At 906, the third party 41 sends the ticket dispense request 27 to an in-store controller 42 (which may communicate with a plurality of point of sale instant win lottery ticket dispensers 40 located in various different retail locations).

At 907, the in-store controller 42 sends a dispense instruction 47 to the point of sale instant win lottery ticket dispenser 40.

At 908, the point of sale instant win lottery ticket dispenser 40 sends a dispense results message 49 to the in-store controller 42 and begins to dispense the instant win lottery ticket 35 which corresponds to the ticket dispense request 27.

At 909, the in-store controller 42 sends the dispense results message 49 to the third party 41.

At 910, the third party sends the dispense results message 49 to the lottery ticket sales facilitation agent 60.

At 911, the cashier 85 separates the instant win lottery ticket 35 that corresponds to the ticket dispense request 27 and delivers the instant win lottery ticket 35 to the consumer 90.

At 912, the lottery ticket sales facilitation agent 60 sends an activation request response message 38 to the point of sale 24 for the requested instant win lottery ticket 35. The activation request response message 38 may be used by the retailer 80 and/or point of sale 24 to track and record activities related to instant win lottery games 20, instant win lottery tickets 35, ticket activation messages 28, ticket dispense requests 27, and or combinations thereof.

Figure 10:
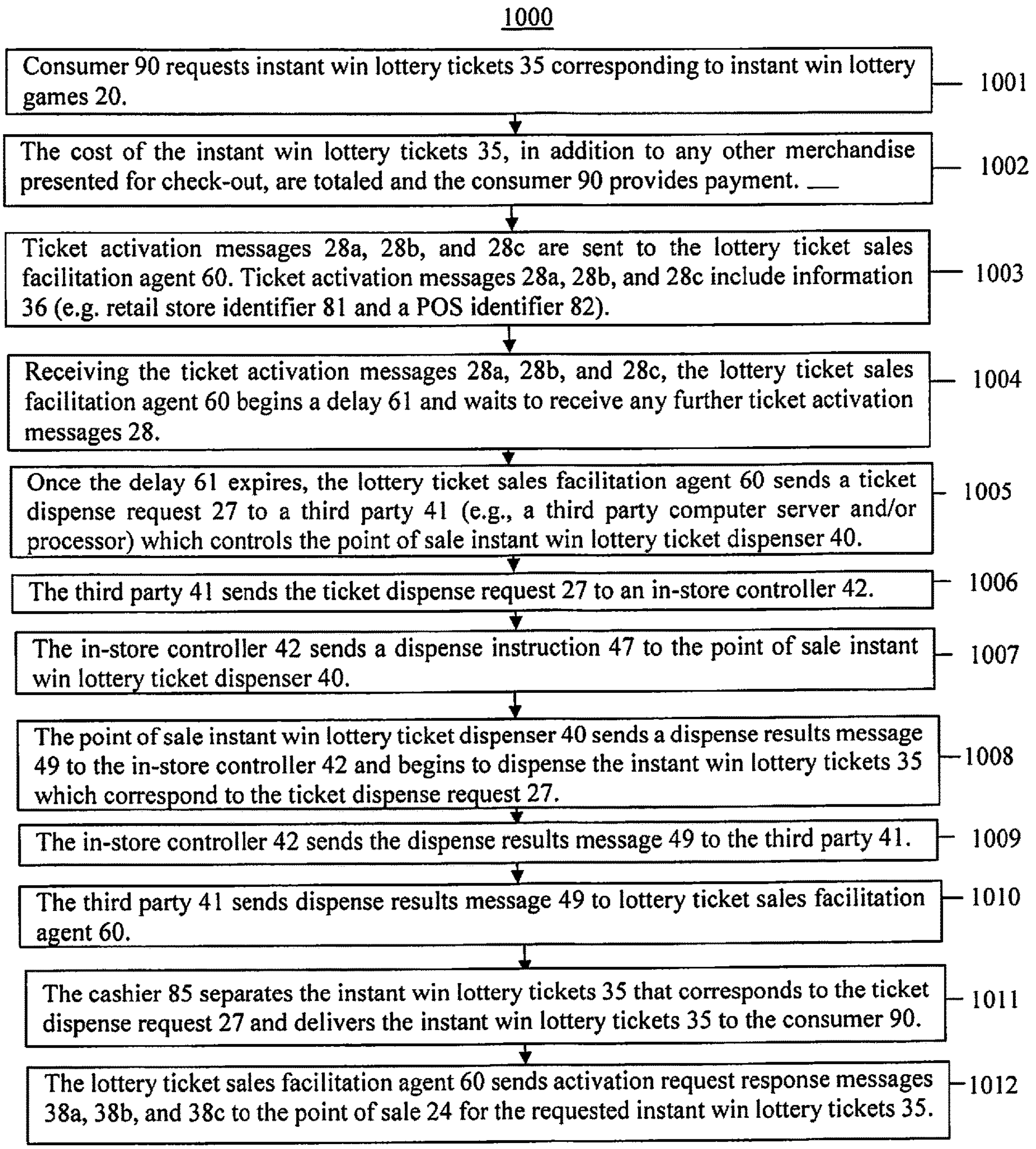
FIG. 10 is a process flow chart of an embodiment of a process for dispensing instant win lottery tickets at an in-store check-out lane upon receipt of a consumer's selection of instant win lottery games to play.

FIG. 10 depicts a process 1000 for providing instant win lottery tickets 35 to a consumer 90 at a retailer's point of sale check-out lane 83 in response to a consumer's selection of several instant win lottery games 20 which the consumer 90 wants to play.

At 1001, a consumer 90, at a point of sale 24, asks for instant win lottery tickets 35 corresponding to instant win lottery games 20, i.e., the consumer 90 asks for two instant win lottery tickets 35 for instant win lottery game A 21 and one instant win lottery ticket 35 for instant win lottery game B 22.

In an embodiment, a cashier 85 retrieves a scan ring 18 and scans an interpretable identifier 15, e.g., a bar code 16 or intelligent code 17, corresponding to each of the instant win lottery games 20 asked for by the consumer 90, e.g., interpretable identifier 15 for instant win lottery game A 21 is scanned twice producing two ticket dispense requests messages (e.g., 23*a* and 23*b*) and interpretable identifier 15 for instant win lottery game B 22 is scanned once producing one ticket dispense request message (e.g., 23*c*).

In an embodiment, the consumer 90 presents an instant win hang-tag 10 to the cashier 85 which contains an interpretable identifier 15, e.g., a bar code 16 or intelligent code 17, corresponding to each particular instant win lottery game 20, e.g. instant win lottery game A 21 and instant win lottery game B 22. Each scan of the bar code 16 (or intelligent code 17) on the respective hang tags 10 produces a ticket dispense request message (e.g., 23*a*, 23*b*, and 23*c*) for the instant win lottery game 20 associated with the particular hang tag 10.

In an embodiment, the consumer 90 presents an image 55 (displayed on consumer's device 50) to the cashier 85 which contains an interpretable identifier 15, e.g., a bar code 16 or intelligent code 17, corresponding to a particular instant win lottery game 20. Each scan of the bar code 16 (or intelligent code 17) produces a ticket dispense request message (e.g., messages 23*a* and 23*b* for a scan of image 55*a* which corresponds to instant win lottery game A 21 or message 23*c* for a scan of image 55*b* which corresponds to instant win lottery game B 22) for the instant win lottery game 20 associated with the particular image 55. For example, the consumer could display image 55*a* corresponding to instant win lottery game A 21 and then display an image 55*b* corresponding to instant win lottery game B 22.

In an embodiment, the consumer 90, via the consumer's device 50, electronically conveys information 91 corresponding to a particular instant win lottery game 20 directly to the point of sale device 25, e.g., via NFC communication, Bluetooth communication, or other known methods for engaging a point of sale device 25 for information reception. Each conveyance of information 91 results in a ticket dispense request message (e.g., 23*a*, 23*b*, and 23*c*). For example, the consumer could convey information 91 corresponding to instant win lottery game A 21 and then convey information 91 corresponding to instant win lottery game B 22.

At 1002, the cost of the instant win lottery tickets 35 to be purchased, in addition to any other merchandise presented for check-out, are totaled and the consumer 90 provides payment.

At 1003, immediately, following a successful payment, a device at the point of sale 24 is programmed to send a ticket activation message 28 for each requested instant win lottery ticket 35 to the lottery ticket sales facilitation agent 60 for each ticket dispense message (e.g., 23*a*, 23*b*, and 23*c*) it has processed. Each ticket activation message 28 will include information 36 identifying the instant win lottery ticket 35 to be dispensed (e.g., information from ticket dispense request messages 23*a*, 23*b*, and 23*c*), a retail store identifier 81, and a POS identifier 82.

At 1004, upon receipt of the first ticket activation message 28 (e.g., message 28*a*), the lottery ticket sales facilitation agent 60 begins a delay 61 (e.g., one second, two, seconds, three seconds, or some portions thereof, etc.), and waits to receive any further ticket activation messages 28 before the delay 61 expires.

At 1005, once the delay 61 expires, the lottery ticket sales facilitation agent 60 sends a ticket dispense request 27 to a third party 41 (e.g., a third party computer server and/or processor) which controls the point of sale instant win lottery ticket dispenser 40. The ticket dispense request 27 may comprise some or all of information 36 contained in the step at 203 along with other types of data.

At 1006, the third party 41 sends the ticket dispense request 27 to an in-store controller 42 (which may communicate with a plurality of point of sale instant win lottery ticket dispensers 40 located in various different retail locations).

At 1007, the in-store controller 42 sends a dispense instruction 47 to the point of sale instant win lottery ticket dispenser 40.

At 1008, the point of sale instant win lottery ticket dispenser 40 sends a dispense results message 49 to the in-store controller 42 and begins to dispense the instant win lottery tickets 35 which corresponds to the ticket dispense request 27.

At 1009, the in-store controller 42 sends the dispense results message 49 to the third party 41.

At 1010, the third party sends the dispense results message 49 to the lottery ticket sales facilitation agent 60.

At 1011, the cashier 85 separates the instant win lottery tickets 35 that correspond to the ticket dispense request 27 and delivers the instant win lottery tickets 35 to the consumer 90.

At 1012, the lottery ticket sales facilitation agent 60 sends an activation request response message 38 to the point of sale 24 for each requested instant win lottery ticket 35 (e.g., activation request response messages 38*a*, 38*b*, and 38*c*). The activation request response message 38 may be used by the retailer 80 and/or point of sale 24 to track and record activities related to instant win lottery games 20, instant win lottery tickets 35, ticket activation messages 28, ticket dispense requests 27, and or combinations thereof.

Figure 11:
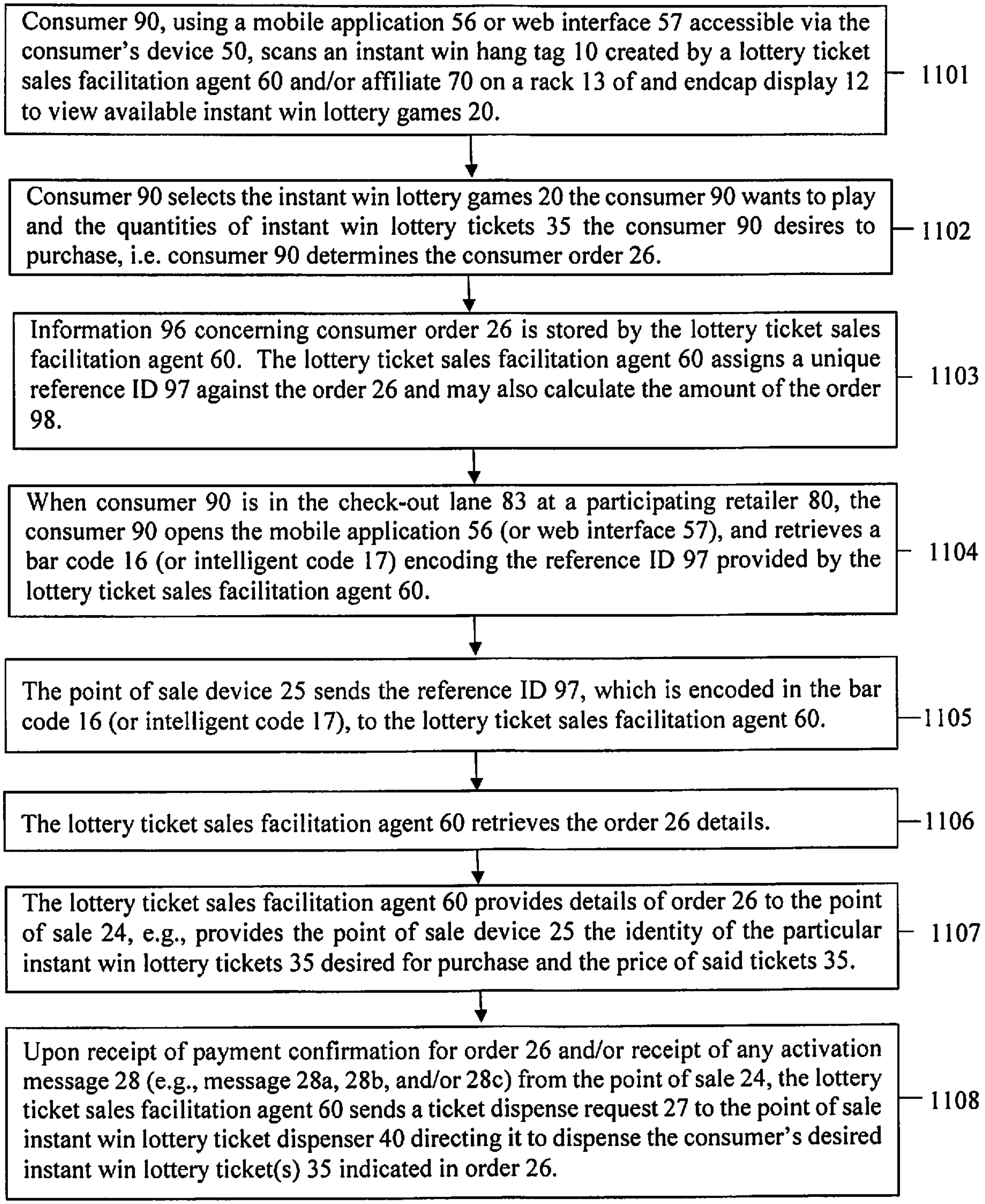
FIG. 11 is a process flow chart of an embodiment of a process for dispensing an instant win lottery ticket at an in-store check-out lane upon receipt of a consumer's selection of an instant win lottery game to play.

FIG. 11 depicts a process 1100 in which a consumer, using its electronic device 50, selects at least one instant win lottery game 20 in which to participate and provides the selected instant win lottery game(s) 20 information and quantity of instant win lottery tickets 35 desired to a retailer's point of sale device 25. The process depicted in FIG. 11 may be employed in the processes detailed in FIG. 1 and FIG. 2 (as well as the processes of other Figures disclosed herein).

At 1101, a consumer 90, using a mobile application 56 or web interface 57 accessible via the consumer's device 50, views available instant win lottery games 20 loaded in a point of sale instant win lottery ticket dispenser 40. In an embodiment, the consumer 90 may view the available instant win lottery games 20 using mobile application 56 or web interface 57 by scanning an interpretable identifier 15 on an endcap display 12, e.g., by scanning a fixed interpretable identifier 15 on endcap display 12 or by scanning an instant win hang tag 10 comprising an interpretable identifier 15 hanging on a rack 13 of the endcap display 12. In an embodiment the hang tag 10 is created by a lottery ticket sales facilitation agent 60 and/or affiliate 70.

At 1102, the consumer 90 selects the instant win lottery games 20 the consumer 90 wants to play and the quantities of instant win lottery tickets 35 the consumer 90 desires to purchase, i.e. the consumer order 26, and communicates the consumer order 26 to the lottery ticket sales facilitation agent 60 via the mobile application 56 or web interface 57.

At 1103, information 96 concerning the consumer order 26 is stored by the lottery ticket sales facilitation agent 60. The lottery ticket sales facilitation agent 60 assigns a unique reference ID 97 against the order 26, and may also calculate the amount of the order 98.

At 1104, once the consumer 90 is in the check-out lane 83 at a participating retailer 80, the consumer 90 opens the mobile application 56 (or web interface 57), and retrieves a bar code 16 (or intelligent code 17) encoding the reference ID 97 provided by the lottery ticket sales facilitation agent 60, which will be scanned by the cashier 85 (or otherwise interpreted) via a point of sale device 25. In alternative embodiments the reference ID 97 may be communicated to the point of sale 24 by the consumer's device 50 via NFC communication, Bluetooth communication, or other known methods for engaging a point of sale device 25 for information reception.

At 1105, the point of sale device 25 then sends the reference ID 97, which is encoded in the bar code 16 (or intelligent code 17), to the lottery ticket sales facilitation agent 60.

At 1106, the lottery ticket sales facilitation agent 60 retrieves the order 26 details.

At 1107, the lottery ticket sales facilitation agent 60 provides details of order 26 to the point of sale 24, e.g., provides the point of sale device 25 the identity of the particular instant win lottery tickets 35 desired for purchase and the price of said tickets 35.

At 1108, upon receipt of payment confirmation for order 26 and/or receipt of any activation message 28 (e.g., message 28*a*, 28*b*, and/or 28*c*) from the point of sale 24, the lottery ticket sales facilitation agent 60 sends a ticket dispense request 27 to the point of sale instant win lottery ticket dispenser 40 directing it to dispense the consumer's desired instant win lottery ticket(s) 35 indicated in order 26.

Figure 12:
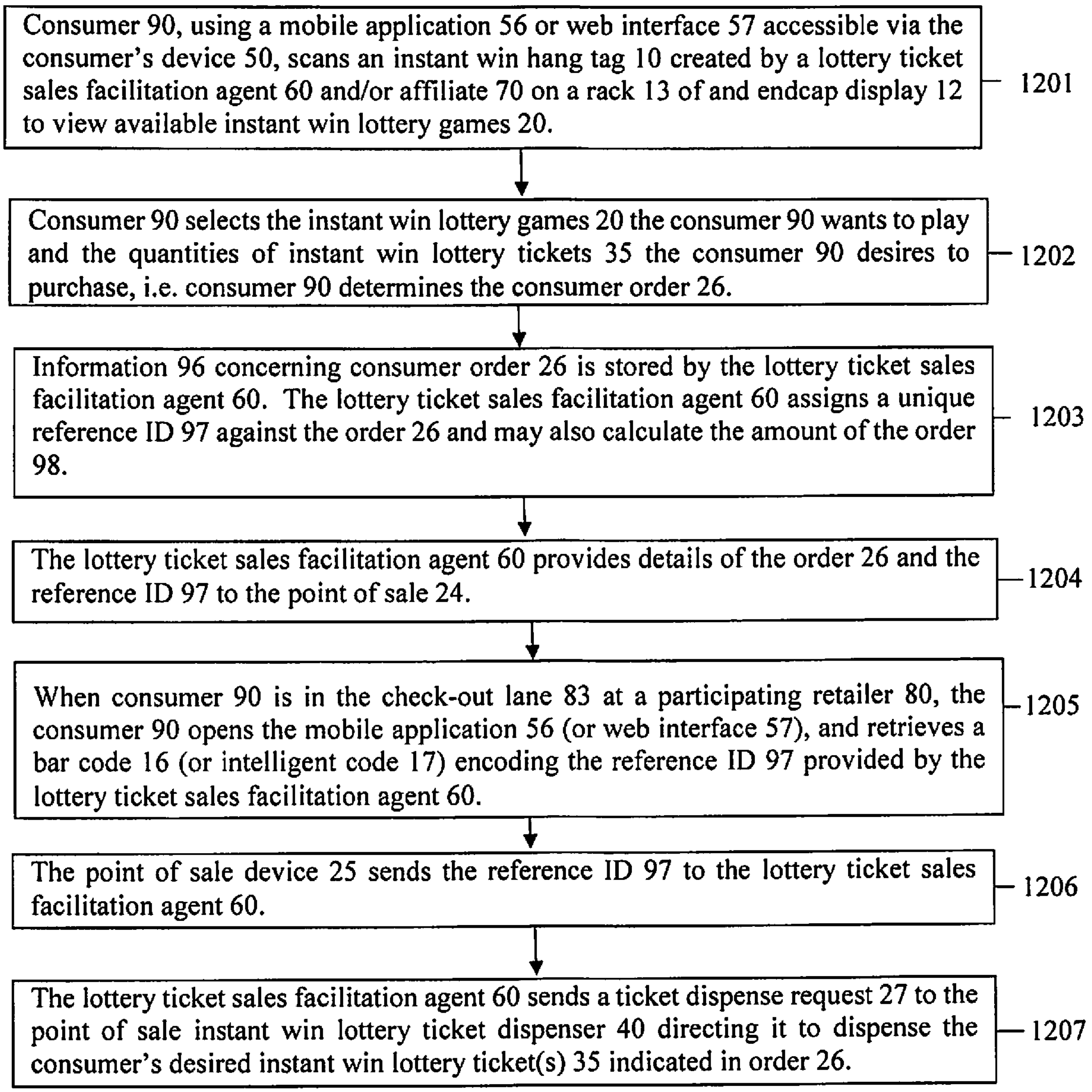
FIG. 12 is a process flow chart of an embodiment of a process for dispensing instant win lottery tickets at an in-store check-out lane upon receipt of a consumer's selection of instant win lottery games to play.

FIG. 12 depicts a process 1200 in which a consumer, using its electronic device 50, selects at least one instant win lottery game 20 in which to participate and provides the selected instant win lottery game(s) 20 information and quantity of instant win lottery tickets 35 desired to a retailer's point of sale device 25. The process depicted in FIG. 12 may be employed in the processes detailed in FIG. 1 and FIG. 2 (as well as the processes of other Figures disclosed herein).

At 1201, a consumer 90, using a mobile application 56 or web interface 57 accessible via the consumer's device 50, views available instant win lottery games 20 loaded in a point of sale instant win lottery ticket dispenser 40.

At 1202, the consumer 90 selects the instant win lottery games 20 the consumer 90 wants to play and the quantities of instant win lottery tickets 35 the consumer desires to purchase, i.e. the consumer order 26, and communicates the consumer order 26 to the lottery ticket sales facilitation agent 60 via the mobile application 56 or web interface 57.

At 1203, information 96 concerning the consumer's order 26 is stored by the lottery ticket sales facilitation agent 60, and the lottery ticket sales facilitation agent 60 assigns a unique reference ID 97 against the order 26, and may also calculate the amount of the order 98.

At 1204, the lottery ticket sales facilitation agent 60 provides details of the order 26 and the reference ID 97 to the point of sale 24.

At 1205, once the consumer 90 is in the check lane 83 at a participating retailer 80, the consumer 90 opens the mobile application 56 (or web interface 57), and retrieves a bar code 16 (or intelligent code 17) encoding the reference ID 97 provided by the lottery ticket sales facilitation agent 60, which will be scanned by the cashier 85 (or otherwise interpreted) via a point of sale device 25. In alternative embodiments the reference ID 97 may be communicated to the point of sale 24 by the consumer's device 50 via NFC communication, Bluetooth communication, or other known methods for engaging a point of sale device 25 for information reception.

At 1206, the point of sale device 25 then sends the reference ID 97 to the lottery ticket sales facilitation agent 60, e.g., a part of activation message 28 (e.g., message 28*a*, 28*b*, and/or 28*c*).

At 1207, the lottery ticket sales facilitation agent 60 sends a ticket dispense request 27 to the point of sale instant win lottery ticket dispenser 40 directing it to dispense the consumer's desired instant win lottery ticket(s) 35 indicated in order 26.

Figure 13:
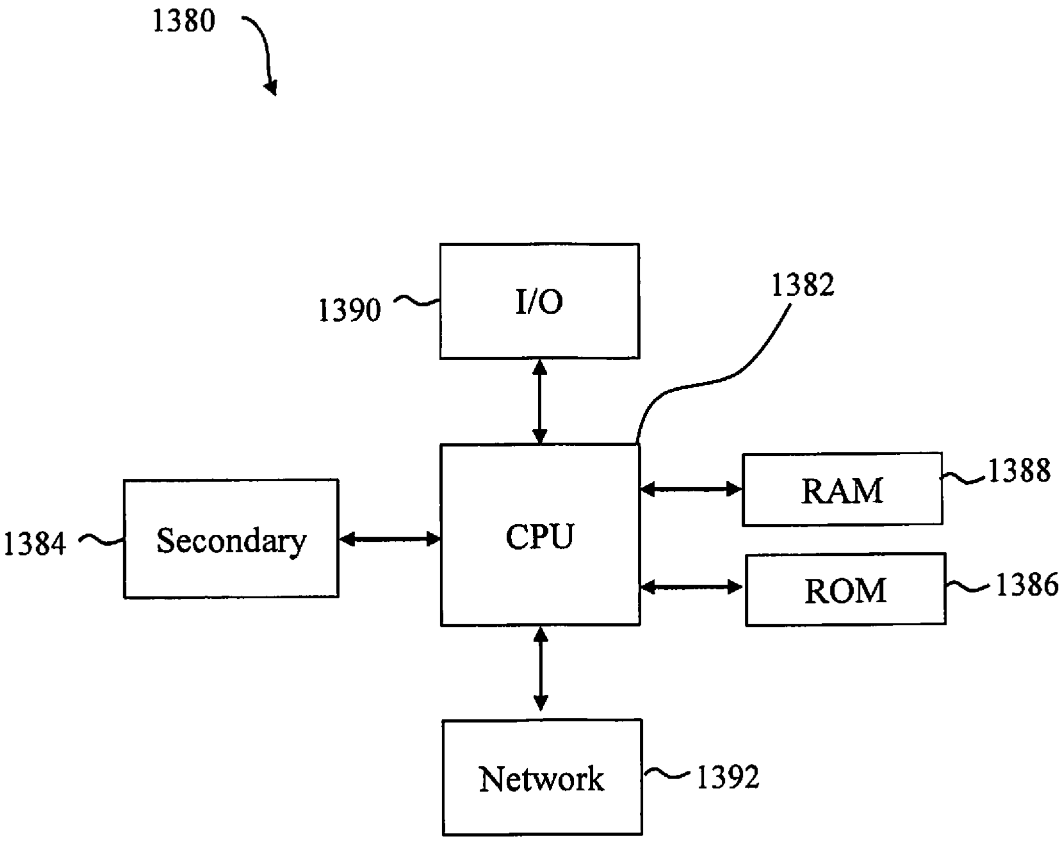
FIG. 13 illustrates a particular machine suitable for implementing the several embodiments of the instant disclosure.

All of, or a portion of, the systems and processes described herein may be implemented on any particular machine, or machines, with sufficient processing power, memory resources, and throughput capability to handle the necessary workload placed upon the computer, or computers. FIG. 13 illustrates a computer system 1380 suitable for implementing all, or a portion of, one or more embodiments disclosed herein. The computer system 1380 includes a processor 1382 (which may be referred to as a central processor unit or CPU) that is in communication with memory devices including secondary storage 1384, read only memory (ROM) 1386, random access memory (RAM) 1388, input/output (I/O) devices 1390, and network connectivity devices 1392. The processor 1382 may be implemented as one or more CPU chips.

It is understood that by programming and/or loading executable instructions onto the computer system 1380, at least one of the CPU 1382, the RAM 1388, and the ROM 1386 are changed, transforming the computer system 1380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 1384 is typically comprised of one or more disk drives or tape drives and is used for non-volatile storage of data and as an over-flow data storage device if RAM 1388 is not large enough to hold all working data. Secondary storage 1384 may be used to store programs which are loaded into RAM 1388 when such programs are selected for execution. The ROM 1386 is used to store instructions and perhaps data which are read during program execution. ROM 1386 is a non-volatile memory device which typically has a small memory capacity relative to the larger memory capacity of secondary storage 1384. The RAM 1388 is used to store volatile data and perhaps to store instructions. Access to both ROM 1386 and RAM 1388 is typically faster than to secondary storage 1384. The secondary storage 1384, the RAM 1388, and/or the ROM 1386 may be referred to in some contexts as computer readable storage media and/or non-transitory computer readable media.

I/O devices 1390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 1392 may enable the processor 1382 to communicate with the Internet or one or more intranets. With such a network connection, it is contemplated that the processor 1382 might receive information from the network or might output information to the network in the course of performing the above-described method steps. Such information, which is often represented as a sequence of instructions to be executed using processor 1382, may be received from and outputted to the network, for example, in the form of a computer data signal embodied in a carrier wave.

Such information, which may include data or instructions to be executed using processor 1382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 1382 executes instructions, codes, computer programs, scripts which it accesses from hard disk, floppy disk, optical disk (these various disk-based systems may all be considered secondary storage 1384), ROM 1386, RAM 1388, or the network connectivity devices 1392. While only one processor 1382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 1384, for example, hard drives, floppy disks, optical disks, and/or other device, the ROM 1386, and/or the RAM 1388 may be referred to in some contexts as non-transitory instructions and/or non-transitory information.

In an embodiment, the computer system 1380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 1380 to provide the functionality of a number of servers that is not directly bound to the number of computers in the computer system 1380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 1380, at least portions of the contents of the computer program product to the secondary storage 1384, to the ROM 1386, to the RAM 1388, and/or to other non-volatile memory and volatile memory of the computer system 1380. The processor 1382 may process the executable instructions and/or data structures in part by directly accessing the computer program product, for example by reading from a CD-ROM disk inserted into a disk drive peripheral of the computer system 1380. Alternatively, the processor 1382 may process the executable instructions and/or data structures by remotely accessing the computer program product, for example by downloading the executable instructions and/or data structures from a remote server through the network connectivity devices 1392. The computer program product may comprise instructions that promote the loading and/or copying of data, data structures, files, and/or executable instructions to the secondary storage 1384, to the ROM 1386, to the RAM 1388, and/or to other non-volatile memory and volatile memory of the computer system 1380.

In some contexts, the secondary storage 1384, the ROM 1386, and the RAM 1388 may be referred to as a non-transitory computer readable medium or a computer readable storage media. A dynamic RAM embodiment of the RAM 1388, likewise, may be referred to as a non-transitory computer readable medium in that while the dynamic RAM receives electrical power and is operated in accordance with its design, for example during a period of time during which the computer 1380 is turned on and operational, the dynamic RAM stores information that is written to it. Similarly, the processor 1382 may comprise an internal RAM, an internal ROM, a cache memory, and/or other internal non-transitory storage blocks, sections, or components that may be referred to in some contexts as non-transitory computer readable media or computer readable storage media.

The ordering of steps in the various processes, data flows, and flowcharts presented are for illustration purposes and do not necessarily reflect the order that various steps must be performed. The steps may be rearranged in different orders in different embodiments to reflect the needs, desires and preferences of the entity implementing the systems. Furthermore, many steps may be performed simultaneously with other steps in some embodiments.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed. The following numbered entries represent a non-exhaustive collection of exemplary embodiments of the instantly disclosed subject matter.

What is claimed is:

1. A computer-implemented method for distributing instant win lottery tickets at a point of sale check-out lane, the method comprising:

providing, by a first party to a second party, an interpretable identifier which corresponds to an instant win lottery game and wherein the interpretable identifier is made available to an instant win lottery ticket consumer by the second party and configured for use by the instant win lottery ticket consumer to select the instant win lottery game by the first party;

receiving, by the first party from the second party, an activation message for an instant win lottery ticket, wherein the instant win lottery ticket is associated with the instant win lottery game; and sending, by a party which is different from the second party, an instant win lottery ticket dispense request, wherein the instant win lottery ticket dispense request causes an instant win lottery ticket dispenser to dispense the instant win lottery ticket.

2. The computer-implemented method for distributing instant win lottery tickets at a point of sale check-out lane of claim 1, wherein the request for the instant win lottery ticket is received from a point of sale.

3. The computer-implemented method for distributing instant win lottery tickets at a point of sale check-out lane of claim 1, wherein the instant win lottery ticket dispenser is located at the point of sale check-out lane.

4. The computer-implemented method for distributing instant win lottery tickets at a point of sale check-out lane of claim 3, wherein the instant win lottery ticket dispenser is a third-party's device.

5. The computer-implemented method for distributing instant win lottery tickets at a point of sale check-out lane of claim 1, wherein the instant win lottery ticket is dispensed at the check-out lane.

6. The computer-implemented method for distributing instant win lottery tickets at a point of sale check-out lane of claim 1, further comprising delaying sending the instant win lottery ticket dispense request for a period of time after receiving the request for an instant win lottery ticket.

7. The computer-implemented method for distributing instant win lottery tickets at a point of sale check-out lane of claim 6, wherein the period of time is one second, two seconds, three seconds, or some portions thereof.

8. The computer-implemented method for distributing instant win lottery tickets at a point of sale check-out lane of claim 1, further comprising sending, by the first party, a ticket dispense status update message.

9. The computer-implemented method for distributing instant win lottery tickets at a point of sale check-out lane of claim 8, further comprising initiating, by the first party, a wait timer prior to sending the ticket dispense status update message.

10. The computer-implemented method for distributing instant win lottery tickets at a point of sale check-out lane of claim 1, wherein the instant win lottery ticket dispense request is sent to the instant win lottery ticket dispenser.

11. The computer-implemented method for distributing instant win lottery tickets at a point of sale check-out lane of claim 1, wherein the instant win lottery ticket dispense request is sent to a third party which controls the instant win lottery ticket dispenser.

12. The computer-implemented method for distributing instant win lottery tickets at a point of sale check-out lane of claim 1, further comprising sending, by the first party, an activation request response message to the point of sale.

13. The computer-implemented method for distributing instant win lottery tickets at a point of sale check-out lane of claim 1, wherein the interpretable identifier is scanned by a consumer's device and wherein the consumer's device uses a mobile application to communicate a desired instant win lottery ticket for purchase.

14. The computer-implemented method for distributing instant win lottery tickets at a point of sale check-out lane of claim 13, further comprising assigning a unique reference ID to the desired instant win lottery ticket for purchase.

15. The computer-implemented method for distributing instant win lottery tickets at a point of sale check-out lane of claim 14, further comprising sending the unique reference ID to the point of sale.

16. A computer-implemented method for distributing instant win lottery tickets at a point of sale check-out lane, the method comprising:

providing, by a first party to a second party, an interpretable identifier which corresponds to an instant win lottery game and wherein the interpretable identifier is made available to an instant win lottery ticket consumer by the second party and configured for use by the instant win lottery ticket consumer to select the instant win lottery game by the first party;

receiving, by the first party from the second party, an activation message for an instant win lottery ticket, wherein the instant win lottery ticket is associated with the instant win lottery game;

sending, by a party which is different from the second party, an instant win lottery ticket dispense request, wherein the instant win lottery ticket dispense request causes an instant win lottery ticket dispenser to dispense the instant win lottery ticket; and receiving, from a third party, a dispense message, wherein the dispense message comprises information concerning instructions sent to the instant win lottery ticket dispenser.

17. The computer-implemented method for distributing instant win lottery tickets at a point of sale check-out lane of claim 16, wherein the third party controls the instant win lottery ticket dispenser.

18. A system for distributing instant win lottery tickets at a point of sale check-out lane comprising:

a computer system, wherein the computer system comprises a central processor unit which executes stored executable instructions which cause the computer system to:

provide, by a first party to a second party, an interpretable identifier which corresponds to an instant win lottery game and wherein the interpretable identifier is made available to an instant win lottery ticket consumer by the second party and configured for use by the instant win lottery ticket consumer to select the instant win lottery game by the first party;

receive, by a first party from the second party, an activation message for an instant win lottery ticket, wherein the instant win lottery ticket is associated with the instant win lottery game; and send, by a party which is different from the second party, an instant win lottery ticket dispense request, wherein the instant win lottery ticket dispense request causes an instant win lottery ticket dispenser to dispense the instant win lottery ticket.

19. The system for distributing instant win lottery tickets at a point of sale check-out lane of claim 18, wherein the computer system is further caused to:

receive, from a third party, a dispense message, wherein the dispense message comprises information concerning instructions sent to the instant win lottery ticket dispenser.

* * * * *